United States Patent [19]
Rosenberg et al.

[11] Patent Number: 6,147,674
[45] Date of Patent: Nov. 14, 2000

[54] METHOD AND APPARATUS FOR DESIGNING FORCE SENSATIONS IN FORCE FEEDBACK COMPUTER APPLICATIONS

[75] Inventors: Louis B. Rosenberg, Pleasanton; Dean C. Chang, Palo Alto, both of Calif.

[73] Assignee: Immersion Corporation, San Jose, Calif.

[21] Appl. No.: 08/846,011

[22] Filed: Apr. 25, 1997

Related U.S. Application Data

[63] Continuation-in-part of application No. 08/566,282, Dec. 1, 1995, Pat. No. 5,734,373, and a continuation-in-part of application No. 08/664,086, Jun. 14, 1996, Pat. No. 6,028,593.

[51] Int. Cl.[7] .................................................. G06F 3/033
[52] U.S. Cl. ................................. 345/157; 345/326
[58] Field of Search .................................. 345/146, 156, 345/157, 161, 163, 326, 333; 318/568.11, 568.25; 74/471 XY; 463/30, 37, 38; 434/45; 395/99; 244/233

[56] References Cited

U.S. PATENT DOCUMENTS

| | | | |
|---|---|---|---|
| 3,919,691 | 11/1975 | Noll | 340/172.5 |
| 4,477,043 | 10/1984 | Repperger | 244/223 |
| 4,800,721 | 1/1989 | Cemenska et al. | 60/393 |
| 4,868,549 | 9/1989 | Affinito et al. | 340/710 |
| 4,896,554 | 1/1990 | Culver | 74/471 XY |
| 4,907,973 | 3/1990 | Hon | 434/262 |
| 4,935,728 | 6/1990 | Kley | 340/709 |
| 5,044,956 | 9/1991 | Behensky et al. | 434/45 |
| 5,076,517 | 12/1991 | Ferranti et al. | 244/228 |
| 5,103,404 | 4/1992 | McIntosh | 318/568.22 |
| 5,116,180 | 5/1992 | Fung et al. | 414/5 |
| 5,146,566 | 9/1992 | Hollis, Jr. et al. | 395/275 |
| 5,185,561 | 2/1993 | Good et al. | 318/432 |
| 5,186,629 | 2/1993 | Rohen | 434/114 |
| 5,193,963 | 3/1993 | McAffee et al. | 414/5 |
| 5,220,260 | 6/1993 | Schuler | 318/561 |
| 5,223,776 | 6/1993 | Radke et al. | 318/568.1 |
| 5,235,868 | 8/1993 | Culver | 74/471 XY |
| 5,341,459 | 8/1994 | Backes | 395/95 |
| 5,354,162 | 10/1994 | Burdea et al. | 414/5 |
| 5,389,865 | 2/1995 | Jacobus et al. | 318/568.11 |
| 5,405,152 | 4/1995 | Katanics et al. | 273/438 |
| 5,414,337 | 5/1995 | Schuler | 318/561 |
| 5,451,924 | 9/1995 | Massimino et al. | 340/407.1 |
| 5,482,051 | 1/1996 | Reddy et al. | 128/733 |

(List continued on next page.)

FOREIGN PATENT DOCUMENTS

| | | |
|---|---|---|
| 0626634A2 | 11/1994 | European Pat. Off. . |
| 0875819 A1 | 10/1998 | European Pat. Off. .......... G06F 3/00 |
| WO9502801 | 1/1995 | WIPO . |
| WO9520788 | 8/1995 | WIPO . |
| WO9532459 | 11/1995 | WIPO . |
| WO9731333 | 8/1997 | WIPO . |

OTHER PUBLICATIONS

Ouh–young, Ming et al., "Creating an Illusion of Feel: Control Issues in Force Display," University of N. Carolina, 1989, pp. 1–14.

(List continued on next page.)

*Primary Examiner*—Jeffery Brier
*Attorney, Agent, or Firm*—James R. Riegel

[57] ABSTRACT

A method and apparatus for designing force sensations for use with a force feedback interface device. A graphical design interface tool displayed on a host computer receives input from a user to select a type of force sensation and to define physical characteristics of a particular force sensation of that type, such as a spring or periodic sensation. A graphical representation of the characterized force sensation is displayed, providing the user with a visual demonstration of a feel of the force sensation. The user can preferably feel the designed force sensation through a force feedback device connected to the computer, and may iteratively modify and update force sensations to achieve a desired feel. The graphical display can also be modified by the user with a cursor or other input to modify the force sensation.

40 Claims, 13 Drawing Sheets

U.S. PATENT DOCUMENTS

| | | | |
|---|---|---|---|
| 5,513,100 | 4/1996 | Parker et al. | 364/167.01 |
| 5,526,480 | 6/1996 | Gibson et al. | 395/154 |
| 5,550,562 | 8/1996 | Aoki et al. | 345/163 |
| 5,551,701 | 9/1996 | Bouton et al. | 345/161 |
| 5,576,727 | 11/1996 | Rosenberg et al. | 345/179 |
| 5,589,854 | 12/1996 | Tsai | 345/161 |
| 5,596,347 | 1/1997 | Robertson et al. | 345/145 |
| 5,625,576 | 4/1997 | Massie et al. | 364/578 |
| 5,629,594 | 5/1997 | Jacobus et al. | 318/568.11 |
| 5,642,469 | 6/1997 | Hannaford et al. | 395/99 |
| 5,643,087 | 7/1997 | Marcus et al. | 463/38 |
| 5,666,138 | 9/1997 | Culver | 345/161 |
| 5,666,473 | 9/1997 | Wallace | 345/420 |
| 5,691,898 | 11/1997 | Rosenberg et al. | 364/190 |
| 5,709,219 | 1/1998 | Chen et al. | 128/782 |
| 5,714,978 | 2/1998 | Yamanaka et al. | 345/157 |
| 5,721,566 | 2/1998 | Rosenberg et al. | 345/161 |
| 5,734,373 | 3/1998 | Rosenberg et al. | 345/161 |
| 5,739,811 | 4/1998 | Rosenberg et al. | 345/161 |
| 5,742,278 | 4/1998 | Chen et al. | 345/156 |
| 5,754,023 | 5/1998 | Rosten et al. | 318/561 |
| 5,755,577 | 5/1998 | Gillio | 434/262 |
| 5,760,764 | 6/1998 | Martinelli | 345/160 |
| 5,767,839 | 6/1998 | Rosenberg | 345/161 |
| 5,769,640 | 6/1998 | Jacobus et al. | 434/262 |
| 5,781,172 | 7/1998 | Engel et al. | 345/164 |
| 5,790,108 | 8/1998 | Salcudean et al. | 345/184 |
| 5,802,353 | 9/1998 | Avila et al. | 395/500 |
| 5,805,140 | 9/1998 | Rosenberg et al. | 345/161 |
| 5,808,601 | 9/1998 | Leah et al. | 345/145 |
| 5,825,308 | 10/1998 | Rosenberg | 341/20 |
| 5,831,408 | 11/1998 | Jacobus et al. | 318/568.11 |
| 5,844,392 | 12/1998 | Peurach et al. | 318/568.17 |
| 5,889,670 | 3/1999 | Schuler et al. | 364/186 |

OTHER PUBLICATIONS

Colgate, J. Edward et al., "Implementation of Stiff Virtual Walls in Force–Reflecting Interfaces," Northwestern University, 1993.

Kelley et al., Magic Mouse: Tactile & Kinesthetic Feedback in the Human–Computer Interface using an Electromagnetically Acutuated Input/Output Device, 1993, University British Columbia.

Hirota et al., "Development Of Surface Display," University Tokyo, IEEE, 1993, pp. 256–262.

Payette et al., "Evaluation Of Force Feedback Computer Pointing device in Zero Gravity," DSC–vol. 58, Proc. of ASME Dynamics Systems and Control Division, 1996, pp. 547–553.

Russo, Massimo, "The Design & Implementation of a Three Degree of Freedom Force Output Joystick," Dept. of Mech. Engineering, 1990, pp. 1–40.

Schmult, B. et al., "Application Areas for a Force–Feedback Joystick," DSC–vol. 49, Advances in Robotics Mechatronics, and Haptic Interfaces, ASME 1993, pp. 47–54.

Atkinson, W. et al., "Computing with Feeling," Comp. & Graphics, vol. 2, 1976, pp. 97–103.

Kelley et al., "On the Development of a Force–Feedback Mouse & It's Integration into a Graphical User Interface," Int'l Mechanical Engineering Congress and Exhibition, 1994, pp. 1–8.

Minsky, Margaret et al., "Feeling & Seeing: Issues in Force Display," ACM 1990, pp. 235–242, 270.

Rosenberg et al., "The use of force feedback to enhance graphical user interfaces," Stereoscopic Displays and Virtual Reality Systems, Proc. SPIE, 1996, pp. 243–248.

Hannaford et al., "Force Feedback Cursor Control," NASA Tech Brief, vol. 13, No. 11, Item #21, 1989, pp. 1–4.

Hiroo Iwata, "Artificial Reality with Force–Feedback: Development of Desktop Virtual Space with Compact Master Manipulator," Computer Graphics, vol. 24, No. 4, 1990, pp. 165–170.

Rosenberg et al., "Commercially Viable Force Feedback Controller for Individuals with Neuromotor Disabilities," Crew Systems Directorate, AL/CF–TR–1997–0016, 1996, pp. 1–33.

Su, S. Augustine et al., "The Virtual Panel Architecture: A 3D Gesture Framework," IEEE 1993, pp. 387–393.

Brooks Jr., Frederick et al., "Project GROPE–Haptic Displays for Scientific Visualization," Computer Graphics, vol. 24, No. 4, 1990, pp. 177–185.

Adelstein, B. et al., "Design & Implementation of a Force Reflecting Manipulandum for Manual Control Research," NASA Ames Research, 1992, pp. 1–24.

Winey III et al., "Computer Simulated Visual & Tactile Feedback as an aid to Manipulator & Vehicle Control," MIT, 1981, pp. 1–79.

Kilpatrick et al., "The Use of Kinesthetic Supplement in an Interactive Graphics System," University of North Carolina, 1976, pp. 1–174.

Rosenberg et al., "Perceptual Decomposition of Virtual Haptic Surfaces," Proc. IEEE Symposium on Research Frontiers in Virtual Reality, 1993.

Rosenberg, "Virtual haptic Overlays enhance performance in telepresence tasks," Stanford University, 1994.

Ouh–Young et al., "Using A Manipulator for Force Display in Molecular Docking,", University North Carolina, IEEE 1988, pp. 1824–1829.

Bejczy et al., "The Phantom Robot: Predictive Displays for Teleoperation with Time Display,", CA Institute of Technology, IEEE 1990, pp. 546–550.

Munch et al., "Intelligent Control for Haptic Displays," Eurographics '96, Blackwell Publishers, vol. 15, No. 3, 1996, pp. C–217–226.

Akamatsu et al., "Multimodal Mouse: A Mouse–Type Device with Tactile & Force Display," Presence, vol. 3, No. 1, 1994, pp. 73–80.

Tan, Hong et al., "Human Factors for the Design of Force–Reflecting Haptic Interfaces, " MIT, 1994.

Jones, L.A. et al., "A Perceptual Analysis of Stiffness, " Experimental Brain Research (1990) 79:150–156.

Rosenberg, L., "Perceptual Design of a Virtual Rigid Surface Contact," Air Force Materiel Command, AL/CF–TR–1995–0029, 1993, pp. 1–39.

Rosenberg, L., "The Use of Fixtures to Enhance Operator Performance in Time Delayed Teleoperation," Air Force Materiel Command, AL/CF–TR–1994–0139, 1993, pp. 1–45.

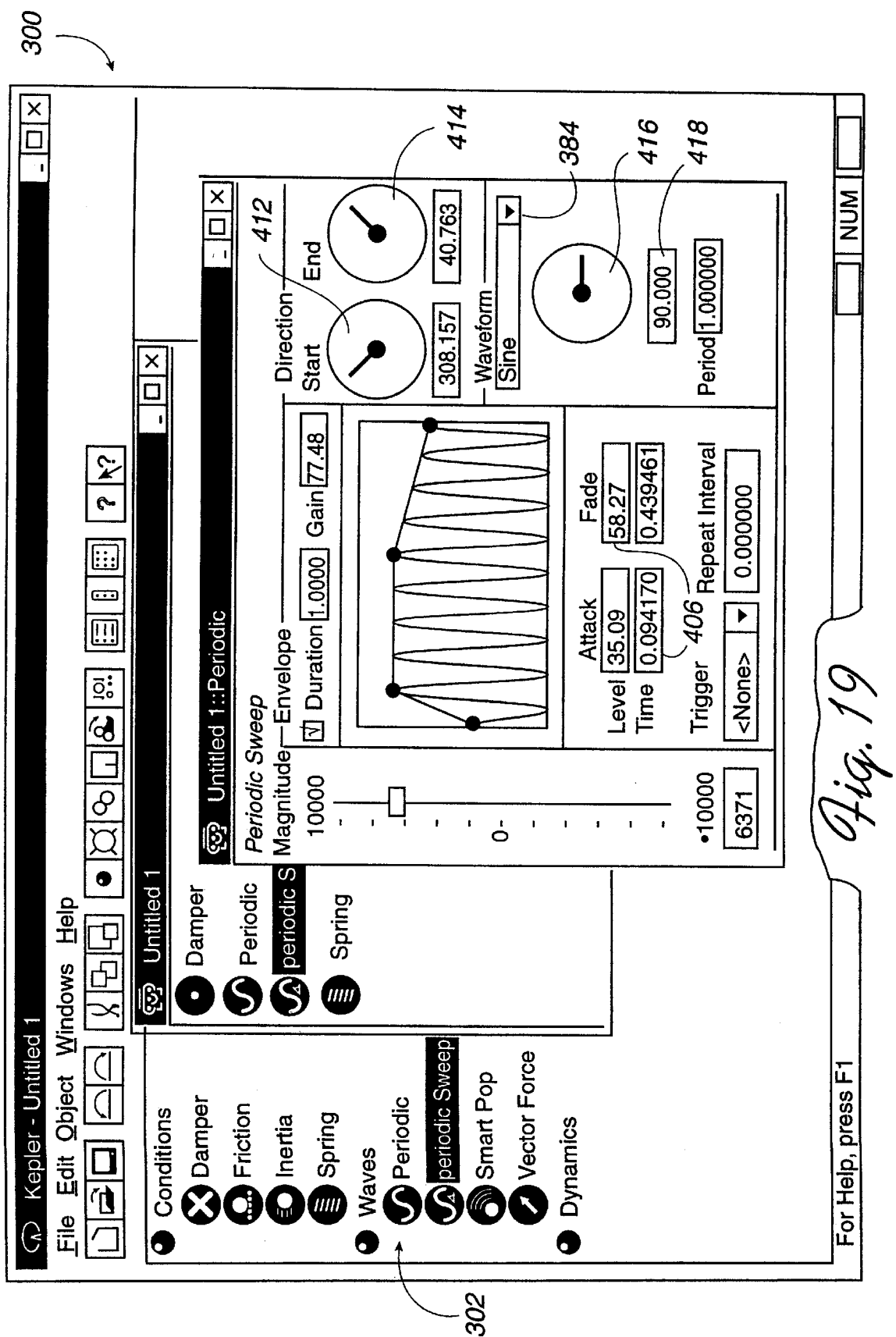

METHOD AND APPARATUS FOR DESIGNING FORCE SENSATIONS IN FORCE FEEDBACK COMPUTER APPLICATIONS

CROSS REFERENCE TO RELATED APPLICATIONS

This application is a continuation-in-part of parent patent application Ser. No. 08/566,282, filed Dec. 1, 1995, now U.S. Pat. No. 5,734,373, on behalf of Louis B. Rosenberg et al., entitled, "Method and Apparatus for Controlling Force Feedback Interface Systems Utilizing a Host Computer," and parent patent application Ser. No. 08/664,086, now U.S. Pat. No. 6,028,593, filed Jun. 14 1996, on behalf of Rosenberg et al., entitled, "Method and Apparatus for Providing Physical Simulated Interactions within Computer Generated Environments", both assigned to the assignee of this present application, and both of which are incorporated by reference herein in their entirety.

BACKGROUND OF THE INVENTION

The present invention relates generally to interface devices for allowing humans to interface with computer systems, and more particularly to computer interface devices that allow the user to provide input to computer systems and allow computer systems to provide force feedback to the user.

Users interact with computer systems for a variety of reasons. A computer system typically displays a visual environment to a user on a display output device. Using an interface device, a user can interact with the displayed environment to perform functions and tasks on the computer, such as playing a game, experiencing a simulation or virtual reality environment, using a computer aided design system, operating a graphical user interface (GUI), or otherwise influencing events or images depicted on the screen. Common human-computer interface devices used for such interaction include a joystick, mouse, trackball, stylus, tablet, pressure-sensitive ball, or the like, that is connected to the computer system controlling the displayed environment. Typically, the computer updates the environment in response to the user's manipulation of a user-manipulatable physical object such as a joystick handle or mouse, and provides visual and audio feedback to the user utilizing the display screen and audio speakers. The computer senses the user's manipulation of the user object through sensors provided on the interface device that send locative signals to the computer. For example, the computer displays a cursor, controlled vehicle, or other graphical object in a graphical environment, where the location or motion of the graphical object is responsive to the to the motion of the user object. The user can thus control the graphical object by moving the user object.

In some interface devices, tactile and/or haptic feedback is also provided to the user, more generally known as "force feedback." These types of interface devices can provide physical sensations which are felt by the user manipulating a user manipulable object of the interface device. For example, the Force-FX joystick controller from CH Products, Inc. and Immersion Corporation may be connected to a computer and provides forces to a user of the controller. Other systems might use a force feedback mouse controller. One or more motors or other actuators are coupled to the joystick or other user object and are connected to the controlling computer system. The computer system controls forces on the joystick in conjunction and coordinated with displayed events and interactions by sending control signals or commands to the actuators. The computer system can thus convey physical force sensations to the user in conjunction with other supplied feedback as the user is grasping or contacting the joystick or other object of the interface device. For example, when the user moves the manipulatable object and causes a displayed cursor to interact with a different displayed graphical object, the computer can issue a command that causes the actuator to output a force on the user object, conveying a feel sensation to the user.

A common use for force feedback interface devices such as joysticks is in video game applications, either in first person or third person perspectives. In first person virtual reality games, the player may fly a simulated aircraft or spaceship, move a warrior in a fighting game, etc. In third person games, the player may control a vehicle, person, or object as if viewing the object from an exterior view. Sensors on the joystick allow the user to influence motion of the airplane or other entity, while actuators on the joystick allow the user to feel realistic force sensations. For example, an aircraft is flown into a simulated storm, where the host computer issues a force command that causes the actuators to create a feel of turbulence. This turbulence shakes the joystick in a convincing manner coordinated with the simulated storm. In other applications, a user-controlled cursor in a graphical environment such as a graphical user interface is well suited for use with force feedback.

A current problem with the prior art force feedback interfaces is that force sensations output by the devices are often predefined, "canned" sensations that are simply output by the interface device when instructed by the host computer. For example, a jolt force may be output by the actuators of the force feedback device in response to an event occurring in a game, such as a collision of a controlled vehicle with an obstacle such as a wall. The prior art force feedback devices simply output a jolt force in a specified direction having a predetermined duration and magnitude. While effective to relay the collision experience to some extent, this jolt may also be unsatisfying for the user, since the user has no way to affect the jolt based on the user's input during the jolt's duration. For example, the user cannot, in anticipation of the collision, cushion the jolt caused by the impact by moving the joystick in the same direction as the jolt or moving the joystick in other ways.

Other force sensations provided by the prior art force feedback devices may be dependent on user input, but only in limited ways. For example, a force feedback interface device may output a damping force in conjunction with a user's "character" traveling through an expanse of liquid, such as swamp muck. The damping force can be modelled as a damping constant multiplied by the velocity of the joystick. Thus, the user feels a different damping force magnitude depending on how fast the joystick is moved. However, this is a crude, simplistic effect, for it fails to take into account undulations or waves in the swamp muck which the user may feel and which may cause the damping force to vary in magnitude and direction. In addition, the user is unable to provide input or skill in changing the affects of the damping to achieve a desired game effect. For example, the player cannot move through the swamp muck in a dexterous manner that absorbs undulations in the liquid to thereby gain greater speed in traveling through the muck, since the simple damping model will not allow this type of interaction.

Furthermore, a programmer of force feedback applications needs a protocol and set of commands which will easily allow the implementation of more realistic and interactive force sensations. Application program developers are concerned with providing high quality programs that include immersive force feedback, but they do not have the time and expertise to program force control routines from scratch.

Another problem with the prior art development of force feedback sensations in software is that the programmer of force feedback applications does not have an intuitive sense as to how forces will feel when adjusted in certain ways, and thus must go to great effort to develop characteristics of forces that are desired for a specific application. For example, a programmer may wish to create a specific spring and damping force sensation between two graphical objects, where the force sensation has a particular stiffness, play, offset, etc. In current force feedback systems, the programmer must determine the parameters and characteristics of the desired force by a brute force method, by simply setting parameters, testing the force, and adjusting the parameters in an iterative fashion. This method is cumbersome because it is often not intuitive how a parameter will affect the feel of a force as it is actually output on the user object; the programmer often may not even be close to the desired force sensation with initial parameter settings. Thus, a tool is needed for assisting the programmer or developer in intuitively and easily setting force feedback characteristics to provide a desired force sensation.

SUMMARY OF THE INVENTION

The present invention is directed to designing and controlling force sensations output by a force feedback interface device. A controlling host computer sends high-level host commands to the interface device to implement dynamic sensations, condition sensations, and effect (wave) sensations. A design interface tool allows intuitive and simple design of force sensations.

More specifically, the present invention relates to a force feedback interface device for use with a host computer that displays and updates a graphical environment in response to user manipulation of the interface device. The host computer commands force sensations in response to the manipulation and in coordination with events within the graphical environment. The interface device includes a user manipulatable object grasped and moveable by a user, such as a mouse or joystick. A sensor detects the movement of the user object and outputs sensor signals representative of the movement, and an actuator applies output force resistance to the user object. A local microprocessor reports representations of the sensor signals to the host computer indicative of the movement of the user object, and the host computer updates the graphical environment based on the reported data. The microprocessor also receives host commands and controls the output force from the actuators in coordination with events in the graphical environment. A dynamic force routine is implemented by the microprocessor in response to a host command which controls a dynamic force sensation output by the actuator. The dynamic force routine implements a simulated physical system including a simulated mass capable of motion independent of said user object. The motion of the simulated mass is influenced by the motion of the object, and forces on the user object are influenced by motion of the user object and motion of the simulated mass.

The host commands are preferably transferred to the local microprocessor using a force feedback command protocol having multiple discrete host commands, each of which may include a command identifier and one or more command parameters. The simulated physical system implemented by the dynamic force routine preferably includes a simulated mass coupled to the user object by a simulated spring and/or a simulated damper which allows the user object to influence and be influenced by forces on the simulated mass during a dynamic force sensation. The host command includes parameters defining the physical system, such as the magnitude of the simulated mass, stiffness of said simulated spring, damping resistance of the simulated damper, an ambient damping resistance, an initial velocity of the simulated mass, an initial position of the simulation mass, and a deadband region in which no force is exerted on the user object.

Multiple different types of dynamic force sensations are implemented by adjusting the parameters defining the simulated physical system. Predefined commands and parameters initiate a Dynamic Recoil to cause the physical system to simulate a recoil of a weapon fired in the graphical environment, a Dynamic Impact to simulate an impact of an object with a user-controlled object in the graphical environment, a Dynamic Liquid causing the physical system to simulate an undulating liquid in which the graphical object is situated which exerts forces on the user object, a Dynamic Inertia for implementing a simulated weight of a graphical object manipulated by the user object in the graphical environment, a Dynamic Center Drift to simulate a drifting mass attached to the user object, a Dynamic Sling to simulate the feel of swinging a mass on a flexible member around the user object, and a Dynamic Paddle to simulate the feel of a mass colliding with a user controlled graphical object and guiding the mass after the collision. In all of these sensations, the user may influence the feel of the sensation during the dynamic sensation. The dynamic force routine may also report positions of the simulated mass to the host computer during the dynamic force sensation.

The provided command protocol may also be used to command other types of sensations, such as conditions and effects (waves). Background conditions dictate physical force characteristics of said interface device including stiffness and damping forces output when the user moves the user manipulatable object. The effects are overlaid forces that dictate time-varying or periodic sensations, such as jolts and vibrations. For example, a wall condition may be implemented as an obstruction force output by the actuator and coordinated with an interaction of a user controlled graphical object with a wall object in the graphical environment. The wall is characterized by parameters including a hardness parameter for defining a rigidness of the wall, a direction(s) in which the wall resists movement of the user object, a puncture parameter for defining a force threshold that, when exceeded, allows the user object to pass through the wall, a through-state parameter for defining a status of the wall after wall penetration, an offset parameter for defining a location of the wall, a surface friction parameter for defining a friction force for a surface of the wall, a surface texture parameter for defining a texture force for the wall surface, a clipping parameter for determining whether positions of the user object are reported to the host computer when the user object penetrates the wall, and a pressure mode parameter for determining whether the obstruction force on the user object is to be proportional to an amount of penetration of the user object into the wall.

In another aspect of the present invention, a design interface for designing force sensations for use with a force feedback interface device is described. Input from a user is received in the interface implemented on a host computer. The input selects a type of force sensation to be commanded by a host computer and output by a force feedback interface device. Input, such as parameters, is then received from a user which designs and characterizes the selected force sensation. A graphical representation of the characterized force sensation is then displayed on a display device of the host computer. The graphical representation provides the user with a visual demonstration of a feel of the characterized force sensation such that said user can view an effect of parameters on said force sensation. The interface can receive and display further changes to the characterized force sensation from the user. Preferably, the characterized force sensation is output on the user object of the force feedback interface device such that the user can feel the designed force sensation. The graphical representation is updated in accordance with the force sensation being output on the user object, promoting further understanding of the effects of the characterization on the output force sensation.

The method and apparatus of the present invention advantageously provides several types of force sensations easily commanded by a command protocol. For example, a wall force sensation is commanded with flexible parameters that characterize important features of the wall. The dynamic force sensations of the present invention allow a user to interact with and influence the force sensations during their application, thus permitting the user to exercise skill and subtlety in game play and drastically increasing the realism of experienced force sensations. The graphical design interface of the present invention allows a programmer to easily and intuitively design the force sensations described herein and visually understand the effect of changes to different aspects of the force sensations.

These and other advantages of the present invention will become apparent to those skilled in the art upon a reading of the following specification of the invention and a study of the several figures of the drawing.

BRIEF DESCRIPTION OF THE DRAWINGS

FIG. 19 is a diagram of the interface of FIG. 13 in which a design window for a periodic sweep effect is displayed.

DETAILED DESCRIPTION OF PREFERRED EMBODIMENTS

Figure 1:
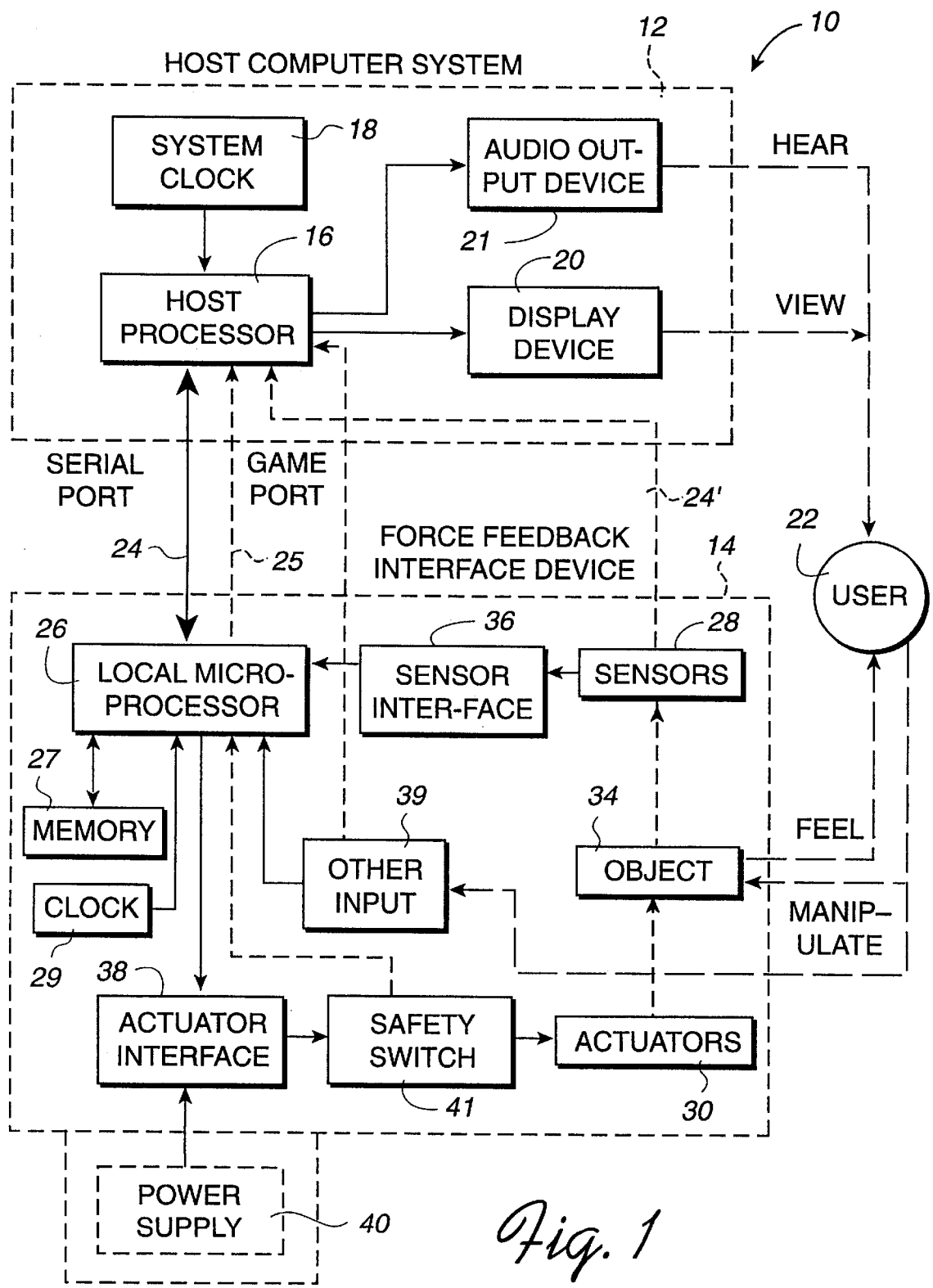
FIG. 1 is a block diagram of a system for controlling a force feedback interface device of the present invention.

FIG. 1 is a block diagram illustrating a force feedback interface system 10 of the present invention controlled by a host computer system. Interface system 10 includes a host computer system 12 and an interface device 14.

Host computer system 12 is preferably a personal computer, such as an IBM-compatible or Macintosh personal computer, or a workstation, such as a SUN or Silicon Graphics workstation. For example, the host computer system can a personal computer which operates under the MS-DOS or Windows operating systems in conformance with an IBM PC AT standard. Alternatively, host computer system 12 can be one of a variety of home video game systems commonly connected to a television set, such as systems available from Nintendo, Sega, or Sony. In other embodiments, home computer system 12 can be a television "set top box" or a "network computer" which can be used, for example, to provide interactive computer functions to users over networks.

In the described embodiment, host computer system 12 implements a host application program with which a user 22 is interacting via peripherals and interface device 14. For example, the host application program can be a video game, medical simulation, scientific analysis program, operating system, graphical user interface, or other application program that utilizes force feedback. Typically, the host application provides images to be displayed on a display output device, as described below, and/or other feedback, such as auditory signals.

Host computer system 12 preferably includes a host microprocessor 16, random access memory (RAM) 17, read-only memory (ROM) 19, input/output (I/O) electronics 21, a clock 18, a display screen 20, and an audio output device 21. Host microprocessor 16 can include a variety of available microprocessors from Intel, AMD, Motorola, or other manufacturers. Microprocessor 16 can be single microprocessor chip, or can include multiple primary and/or coprocessors. Microprocessor preferably retrieves and stores instructions and other necessary data from RAM 17 and ROM 19, as is well known to those skilled in the art. In the described embodiment, host computer system 12 can receive locative data or a sensor signal via a bus 24 from sensors of interface device 14 and other information. Microprocessor 16 can receive data from bus 24 using I/O electronics 21, and can use I/O electronics to control other peripheral devices. Host computer system 12 can also output a "force command" to interface device 14 via bus 24 to cause force feedback for the interface device.

Clock 18 is a standard clock crystal or equivalent component used by host computer system 12 to provide timing to electrical signals used by microprocessor 16 and other components of the computer system. Clock 18 is accessed by host computer system 12 in the force feedback control process, as described subsequently.

Display screen 20 is coupled to host microprocessor 16 by suitable display drivers and can be used to display images generated by host computer system 12 or other computer systems. Display screen 20 can be a standard display screen, CRT, flat-panel display, 3-D goggles, or any other visual interface. In a described embodiment, display screen 20 displays images of a simulation or game environment. In other embodiments, other images can be displayed. For example, images describing a point of view from a first-person perspective can be displayed, as in a virtual reality simulation or game. Or, images describing a third-person perspective of objects, backgrounds, etc. can be displayed. A user 22 of the host computer 12 and interface device 14 can receive visual feedback by viewing display screen 20.

Herein, computer 12 may be referred as displaying computer or graphical "objects" or "entities". These computer objects are not physical objects, but is a logical software unit collections of data and/or procedures that may be displayed as images by computer 12 on display screen 20, as is well known to those skilled in the art. For example, a cursor or a third-person view of a car might be considered player-controlled computer objects that can be moved across the screen. A displayed, simulated cockpit of an aircraft might also be considered an "object", or the simulated aircraft can be considered a computer-implemented "entity".

Audio output device 21, such as speakers, is preferably coupled to host microprocessor 16 via amplifiers, filters, and other circuitry well known to those skilled in the art. Host processor 16 outputs signals to speakers 21 to provide sound output to user 22 when an "audio event" occurs during the implementation of the host application program. Other types of peripherals can also be coupled to host processor 16, such as storage devices (hard disk drive, CD ROM drive, floppy disk drive, etc.), printers, and other input and output devices.

An interface device 14 is coupled to host computer system 12 by a bi-directional bus 24. The bi-directional bus sends signals in either direction between host computer system 12 and the interface device. Herein, the term "bus" is intended to generically refer to an interface such as between host computer 12 and microprocessor 26 which typically includes one or more connecting wires, wireless connection, or other connections and that can be implemented in a variety of ways. In the preferred embodiment, bus 24 is a serial interface bus providing data according to a serial communication protocol. An interface port of host computer system 12, such as an RS232 or Universal Serial Bus (USB) serial interface port, connects bus 24 to host computer system 12. Other standard serial communication protocols can also be used in the serial interface and bus 24, such as RS-422, MIDI, or other protocols well known to those skilled in the art. The USB can also source power to drive peripheral devices and may also provide timing data that is encoded along with differential data.

Alternatively, a parallel port of host computer system 12 can be coupled to a parallel bus 24 and communicate with interface device using a parallel protocol, such as SCSI or PC Parallel Printer Bus. Also, bus 24 can be connected directly to a data bus of host computer system 12 using, for example, a plug-in card and slot or other access of computer 12. Bus 24 can be implemented within a network such as the Internet or LAN; or, bus 24 can be a channel such as the air, etc. for wireless communication. In another embodiment, an additional bus 25 can be included to communicate between host computer system 12 and interface device 14. For example, bus 24 can be coupled to the standard serial port of host computer 12, while an additional bus 25 can be coupled to a second port of the host computer system, such as a "game port." The two buses 24 and 25 can be used simultaneously to provide a increased data bandwidth.

Interface device 14 includes a local microprocessor 26, sensors 28, actuators 30, a user object 34, optional sensor interface 36, an optional actuator interface 38, and other optional input devices 39. Interface device 14 may also include additional electronic components for communicating via standard protocols on bus 24. In the preferred embodiment, multiple interface devices 14 can be coupled to a single host computer system 12 through bus 24 (or multiple buses 24) so that multiple users can simultaneously interface with the host application program (in a multi-player game or simulation, for example). In addition, multiple players can interact in the host application program with multiple interface devices 14 using networked host computers 12, as is well known to those skilled in the art.

Local microprocessor 26 is coupled to bus 24 and is preferably included within the housing of interface device 14 to allow quick communication with other components of the interface device. Processor 26 is considered local to interface device 14, where "local" herein refers to processor 26 being a separate microprocessor from any processors in host computer system 12. "Local" also preferably refers to processor 26 being dedicated to force feedback and sensor I/O of interface device 14, and being closely coupled to sensors 28 and actuators 30, such as within the housing for interface device or in a housing coupled closely to interface device 14. Microprocessor 26 can be provided with software instructions to wait for commands or requests from computer host 16, decode the command or request, and handle/control input and output signals according to the command or request. In addition, processor 26 preferably operates independently of host computer 16 by reading sensor signals and calculating appropriate forces from those sensor signals, time signals, and stored or relayed instructions selected in accordance with a host command. Suitable microprocessors for use as local microprocessor 26 include the MC68HC711E9 by Motorola, the PIC16C74 by Microchip, and the 82930AX by Intel Corp., for example. Microprocessor 26 can include one microprocessor chip, or multiple processors and/or co-processor chips. In other embodiments, microprocessor 26 can include digital signal processor (DSP) capability.

Microprocessor 26 can receive signals from sensors 28 and provide signals to actuators 30 of the interface device 14 in accordance with instructions provided by host computer 12 over bus 24. For example, in a preferred local control embodiment, host computer system 12 provides high level supervisory commands to microprocessor 26 over bus 24, and microprocessor 26 manages low level force control loops to sensors and actuators in accordance with the high level commands and independently of the host computer 18. This operation is described in greater detail with respect to FIG. 4. Microprocessor 26 can also receive commands from any other input devices 39 included on interface apparatus 14 and provides appropriate signals to host computer 12 to indicate that the input information has been received and any information included in the input information.

Local memory 27, such as RAM and/or ROM, is preferably coupled to microprocessor 26 in interface device 14 to store instructions for microprocessor 26 and store temporary and other data. In addition, a local clock 29 can be coupled to the microprocessor 26 to provide timing data, similar to system clock 18 of host computer 12; the timing data might be required, for example, to compute forces output by actuators 30 (e.g., forces dependent on calculated velocities or other time dependent factors). Timing data for microprocessor 26 can be alternatively retrieved from a USB signal on bus 24.

In the preferred embodiment, sensors 28, actuators 30, and microprocessor 26, and other related electronic components are included in a housing for interface device 14, to which user object 34 is directly or indirectly coupled. Alternatively, microprocessor 26 and/or other electronic components of interface device 14 can be provided in a separate housing from user object 34, sensors 28, and actuators 30. Also, additional mechanical structures may be included in interface device 14 to provide object 34 with desired degrees of freedom. Embodiments of mechanisms are described with reference to FIGS. 2a–b and 3.

Sensors 28 sense the position, motion, and/or other characteristics of a user object 34 of the interface device 14 along one or more degrees of freedom and provide signals to microprocessor 26 including information representative of those characteristics. Typically, a sensor 28 is provided for each degree of freedom along which object 34 can be moved. Alternatively, a single compound sensor can be used to sense position or movement in multiple degrees of freedom. An example of sensors suitable for several embodiments described herein are digital optical encoders, which sense the change in position of an object about a rotational axis and provide digital signals indicative of the change in position. A suitable optical encoder is the "Softpot" from U.S. Digital of Vancouver, Wash. Linear optical encoders, potentiometers, optical sensors, velocity sensors, acceleration sensors, strain gauge, or other types of sensors can also be used, and either relative or absolute sensors can be provided.

Sensors 28 provide an electrical signal to an optional sensor interface 36, which can be used to convert sensor signals to signals that can be interpreted by the microprocessor 26 and/or host computer system 12. For example, sensor interface 36 can receive two phase-related signals from a sensor 28 and converts the two signals into another pair of clock signals, which drive a bi-directional binary counter. The output of the binary counter is received by microprocessor 26 as a binary number representing the angular position of the encoded shaft. Such circuits, or equivalent circuits, are well known to those skilled in the art; for example, the Quadrature Chip LS7166 from Hewlett Packard, Califonia performs the functions described above. If analog sensors 28 are used, an analog to digital converter (ADC) can convert the analog signal to a digital signal that is received and interpreted by microprocessor 26 and/or host computer system 12. Each sensor 28 can be provided with its own sensor interface, or one sensor interface may handle data from multiple sensors. Alternately, microprocessor 26 can perform the sensor interface functions. The position value signals can be used by microprocessor 26 and are also sent to host computer system 12 which updates the host application program and sends force control signals as appropriate. In alternate embodiments, sensor signals from sensors 28 can be provided directly to host computer system 12 as shown by bus 24', bypassing microprocessor 26.

Actuators 30 transmit forces to user object 34 of the interface device 14 in one or more directions along one or more degrees of freedom in response to signals received from microprocessor 26. Typically, an actuator 30 is provided for each degree of freedom along which forces are desired to be transmitted. Actuators 30 can include two types: active actuators and passive actuators. Active actuators include linear current control motors, stepper motors, pneumatic/hydraulic active actuators, a torquer (motor with limited angular range), a voice coil actuators, and other types of actuators that transmit a force to move an object. For example, active actuators can drive a rotational shaft about an axis in a rotary degree of freedom, or drive a linear shaft along a linear degree of freedom. Active actuators of the present invention preferably can selectively transmit force along either direction of a degree of freedom. Passive actuators can also be used for actuators 30. Magnetic particle brakes, friction brakes, or pneumatic/hydraulic passive actuators can be used in addition to or instead of a motor to generate a damping resistance or friction in a degree of motion. In alternate embodiments, all or some of sensors 28 and actuators 30 can be included together as a sensor/actuator pair transducer.

Actuator interface 38 can be optionally connected between actuators 30 and microprocessor 26. Interface 38 converts signals from microprocessor 26 into signals appropriate to drive actuators 30. Interface 38 can include power amplifiers, switches, digital to analog controllers (DACs), analog to digital controllers (ADC's), and other components, as is well known to those skilled in the art. In alternate embodiments, interface 38 circuitry can be provided within microprocessor 26, in actuators 30, or in host computer 12.

Other input devices 39 can optionally be included in interface device 14 and send input signals to microprocessor 26 or to host processor 16. Such input devices can include buttons, dials, switches, levers, or other mechanisms. For example, in embodiments where user object 34 is a joystick, other input devices can include one or more buttons provided, for example, on the joystick handle or base and used to supplement the input from the user to a game or simulation. The operation of such input devices is well known to those skilled in the art.

Power supply 40 can optionally be coupled to actuator interface 38 and/or actuators 30 to provide electrical power. Power supply 40 can be included within the housing of interface device 14, or be provided as a separate component. Alternatively, interface device 14 can draw power from the USB (if used) and thus have no (or reduced) need for power supply 40. Also, power from the USB can be stored and regulated by interface device 14 and thus used when needed to drive actuators 30. For example, power can be stored over time in a capacitor or battery and then immediately dissipated to provide a jolt force to the user object 34.

Safety switch 41 is optionally included in interface device 14 to provide a mechanism to allow a user to deactivate actuators 30, or require a user to activate actuators 30, for safety reasons. In the preferred embodiment, the user must continually activate or close safety switch 41 during operation of interface device 14 to enable the actuators 30. If, at any time, the safety switch is deactivated (opened), power from power supply 40 is cut to actuators 30 (or the actuators are otherwise disabled) as long as the safety switch is opened. For example, one embodiment of safety switch is an optical switch located on user object 34 or on a convenient surface of a housing of interface device 14. The switch is closed when the user covers the optical switch with a hand or finger, so that the actuators 30 will function as long as the user covers the switch. Safety switch 41 can also provide a signal directly to host computer 12. Other types of safety switches 41 can be provided in other embodiments, such as an electrostatic contact switch, a button or trigger, a hand weight safety switch, etc. If the safety switch 41 is not provided, actuator interface 38 can be directly coupled to actuators 30.

User manipulable object 34 ("user object") is a physical object, device or article that may be grasped or otherwise contacted or controlled by a user and which is coupled to interface device 14. By "grasp", it is meant that users may releasably engage a grip portion of the object in some fashion, such as by hand, with their fingertips, or even orally in the case of handicapped persons. The user 22 can manipulate and move the object along provided degrees of freedom to interface with the host application program the user is viewing on display screen 20. Object 34 can be a joystick, mouse, trackball, stylus (e.g. at the end of a linkage), steering wheel, sphere, medical instrument (laparoscope, catheter, etc.), pool cue (e.g. moving the cue through actuated rollers), hand grip, knob, button, or other article.

Figure 2A:
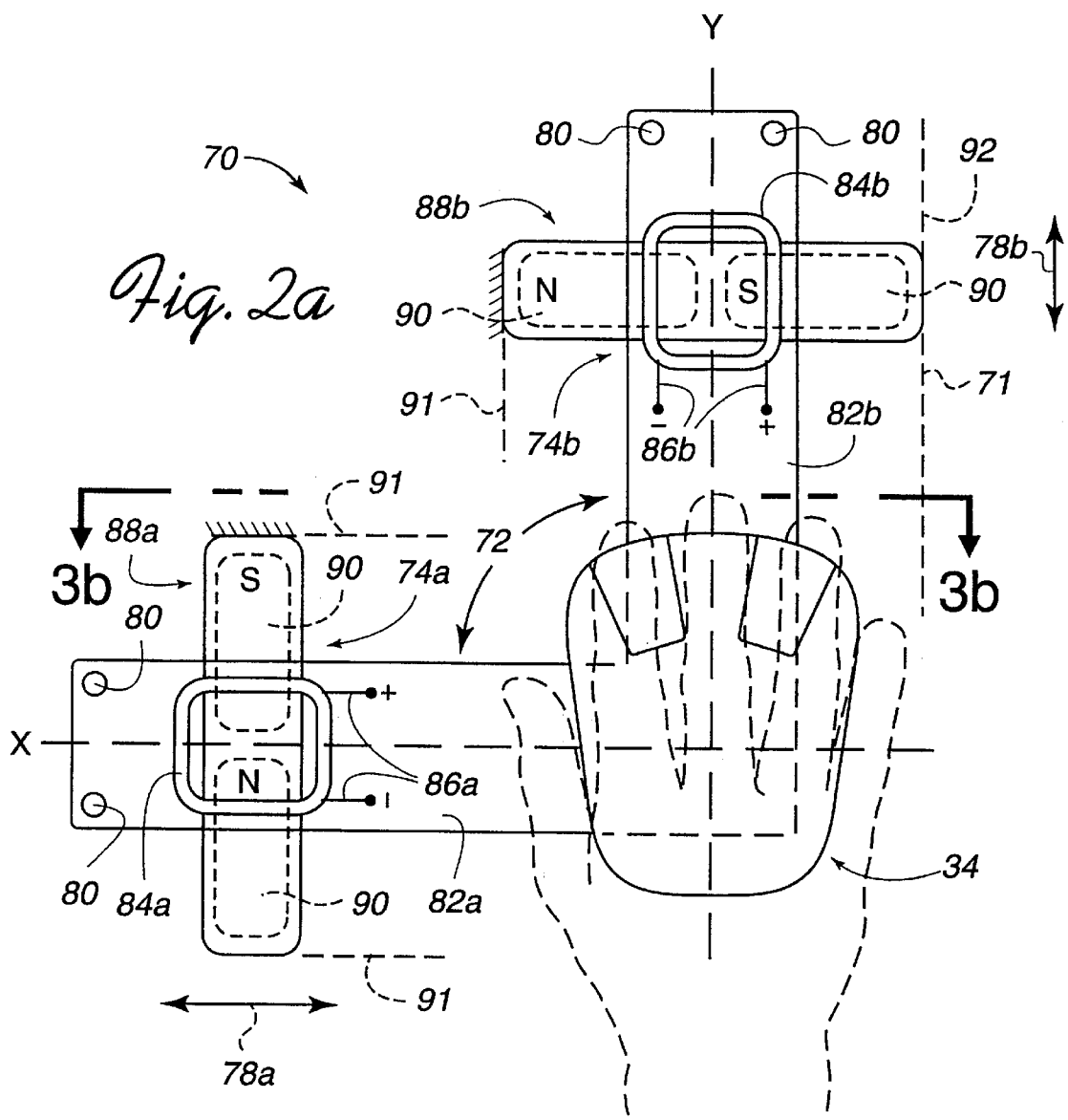
FIGS. 2a–b are top plan and side elevational views, respectively, of a first embodiment of a mechanism for interfacing a user manipulatable object with the force feedback device of FIG. 1.
Figure 2B:
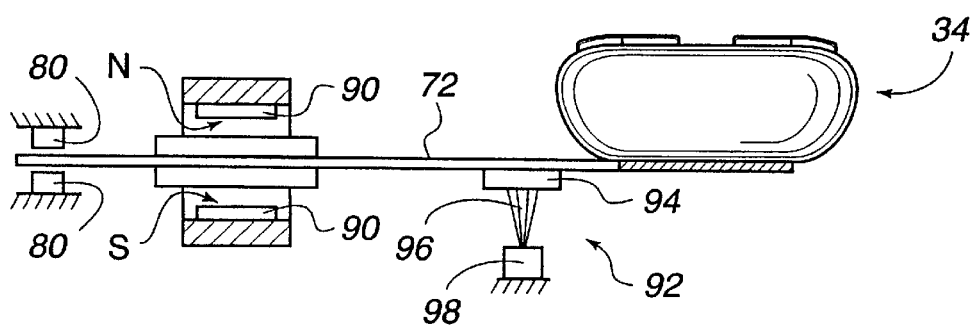

FIG. 2a is a top plan view and FIG. 2b is a side elevational view of one embodiment of an interface apparatus including a mechanical apparatus 70 and user object 34, in which electromagnetic voice coil actuators are used to provide forces to the user object. Such voice coil actuators are described in greater detail in co-pending patent application Ser. No. 08/560,091, now U.S. Pat. No. 5,805,140, incorporated by reference herein. Interface apparatus 70 provides two linear degrees of freedom to user object 34 so that the user can translate object 12 in a planar workspace along the X axis, along the Y axis, or along both axes (diagonal movement). This embodiment is thus preferred for use with a mouse, puck, or similar user object 34 intended for such translatory motion.

Apparatus 70 includes user object 34 and a board 72 that includes voice coil actuators 74a and 74b and guides 80. Object 34 is rigidly coupled to board 72, which, for example, can be a circuit board etched with conductive materials. Board 72 is positioned in a plane substantially parallel to the X-Y plane and floats. Board 72 may thus be translated along axis X and/or axis Y, shown by arrows 78a and 78b, and object 34 is translated in the same directions, thus providing the object 34 with linear degrees of freedom. Board 72 is preferably guided by guides 80, which serve to keep board 72 substantially within a plane parallel to the X-Y plane. Board 72 is provided in a substantially right-angle orientation having one extended portion 82a at 90 degrees from the other extended portion 82b.

Voice coil actuators 74a and 74b are positioned on board 72 such that one actuator 74a is provided on portion 82a and the other actuator 74b is provided on portion 82b. Wire coil 84a of actuator 74a is coupled to portion 82a of board 72 and includes at least two loops etched onto board 72, preferably as a printed circuit board trace. Terminals 86a are coupled to actuator drivers, so that host computer 12 or microprocessor 26 can control the direction and/or magnitude of the current in wire coil 84a. Voice coil actuator 74a also includes a magnet assembly 88a, which preferably includes four magnets 90 and is grounded, where coil 84a is positioned between opposing polarities of the magnet.

The magnetic fields from magnets 90 interact with a magnetic field produced from wire coil 84a when current is flowed in coil 84a to produce forces. As an electric current I is flowed through the coil 84a via electrical connections 86a, a magnetic field is generated from the current and configuration of coil 84a. The magnetic field from the coil then interacts with the magnetic fields generated by magnets 90 to produce a force along axis Y. The magnitude or strength of the force is dependent on the magnitude of the current that is applied to the coil, the number of loops in the coil, and the magnetic field strength of the magnets. The direction of the force depends on the direction of the current in the coil. A voice coil actuator can be provided for each degree of freedom of the mechanical apparatus to which force is desired to be applied.

Limits 91 or physical stops can also be positioned at the edges of the board 72 to provide a movement limit. Voice coil actuator 74b operates similarly to actuator 74a. Alternatively, additional coils can also be provided for actuator 74a or 74b to provide different magnitudes of forces. In yet other embodiments, the translatory motion of board 72 along axes X and Y can be converted to two rotary degrees of freedom, or additional degrees of freedom can be similarly provided with voice-coil actuation, such as an up-down degree of freedom along a z-axis.

Voice coil actuator 74a can also be used as a sensor to sense the velocity, position, and or acceleration of board 72 along axis Y. Motion of coil 84a along axis Y within the magnetic field of magnets 90 induces a voltage across the coil 84a, and this voltage can be sensed. This voltage is proportional to the velocity of the coil and board 72 along axis Y. From this derived velocity, acceleration or position of the board 72 can be derived. In other embodiments, separate digital sensors may be used to sense the position, motion, etc. of object 34 in low cost interface devices. For example, a lateral effect photo diode sensor 92 can be used, including a rectangular detector 94 positioned in a plane parallel to the X-Y plane onto which a beam of energy 96 is emitted from a grounded emitter 98. The position of the board 72 and object 34 can be determined by the location of the beam 96 on the detector.

Figure 3:
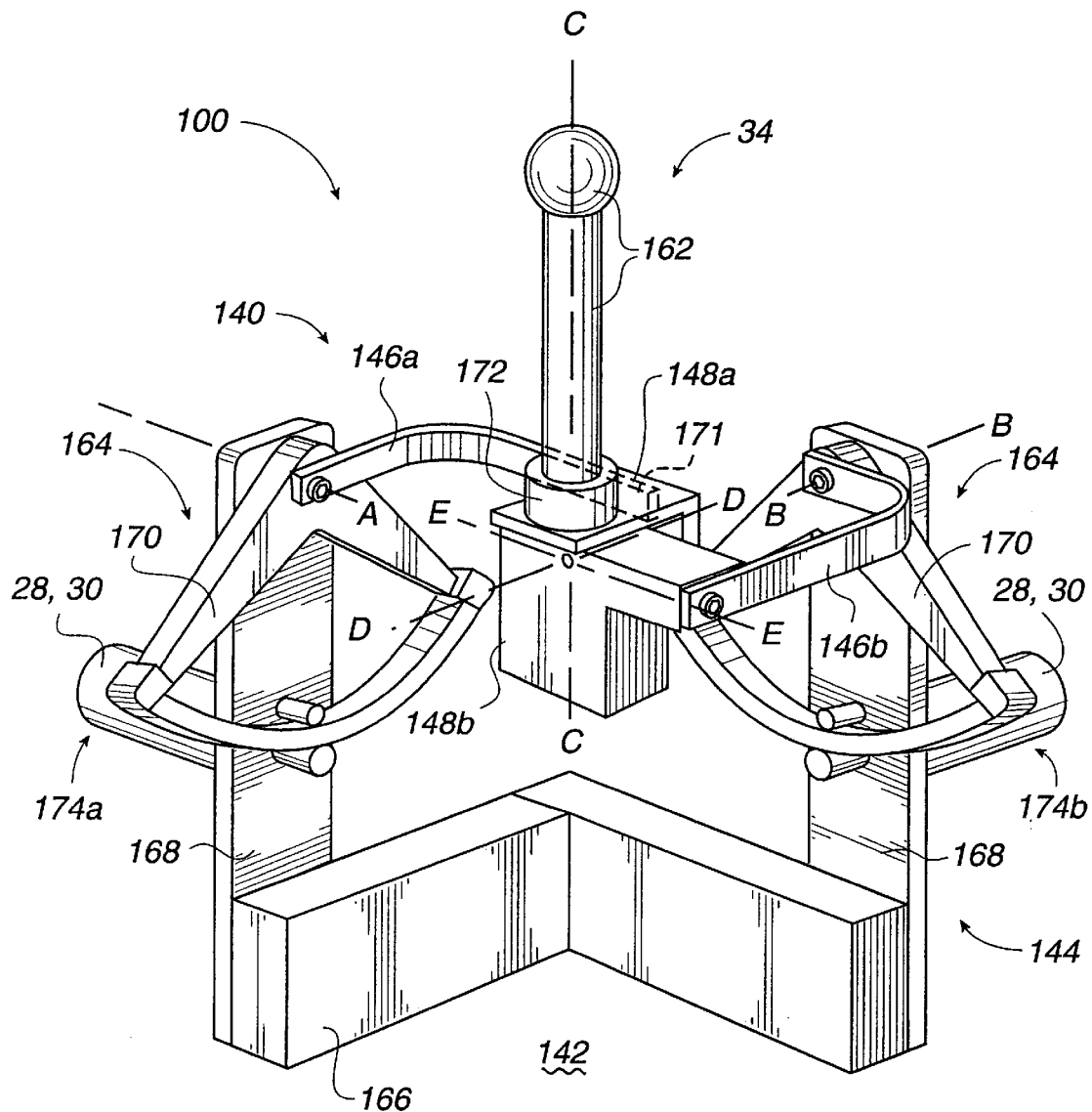
FIG. 3 is a perspective view of a second embodiment of a mechanism for interfacing a user manipulatable object with the force feedback device of FIG. 1.

FIG. 3 is a perspective view of another embodiment of a mechanical apparatus 100 suitable for providing mechanical input and output to host computer system 12. Apparatus 100 is more appropriate for a joystick or similar user object 34. Apparatus 100 includes gimbal mechanism 140, sensors 28 and actuators 30. User object 34 is shown in this embodiment as a joystick having a grip portion 162.

Gimbal mechanism 140 provides two rotary degrees of freedom to object 34. A gimbal device as shown in FIG. 2 is described in greater detail in co-pending patent applications Ser. Nos. 08/374,288 and 08/400,233, now U.S. Pat. Nos. 5,731,804 and 5,767,839, both hereby incorporated by reference in their entirety. Gimbal mechanism 140 provides support for apparatus 160 on grounded surface 142, such as a table top or similar surface. Gimbal mechanism 140 is a five-member linkage that includes a ground member 144, extension members 146a and 146b, and central members 148a and 148b. Gimbal mechanism 140 also includes capstan drive mechanisms 164.

Ground member 144 includes a base member 166 and vertical support members 168. Base member 166 is coupled to grounded surface 142. A vertical support member 168 is coupled to each of these outer surfaces of base member 166 such that vertical members 168 are in substantially 90-degree relation with each other. Ground member 144 is coupled to a base or surface which provides stability for mechanism 140. The members of gimbal mechanism 140 are rotatably coupled to one another through the use of bearings or pivots. Extension member 146a is rigidly coupled to a capstan drum 170 and is rotated about axis A as capstan drum 170 is rotated. Likewise, extension member 146b is rigidly coupled to the other capstan drum 170 and can be rotated about axis B. Central drive member 148a is rotatably coupled to extension member 146a and can rotate about floating axis D, and central link member 148b is rotatably coupled to an end of extension member 146b at a center point P and can rotate about floating axis E. Central drive member 148a and central link member 148b are rotatably coupled to each other at the center of rotation of the gimbal mechanism, which is the point of intersection P of axes A and B. Bearing 172 connects the two central members 148a and 148b together at the intersection point P.

Gimbal mechanism 140 is formed as a five member closed chain such that each end of one member is coupled to the end of a another member. Gimbal mechanism 140 provides two degrees of freedom to an object 34 positioned at or near to the center point P of rotation, where object 34 can be rotated about axis A and/or B. In alternate embodiments, object 34 can also be rotated or translated in other degrees of freedom, such as a linear degree of freedom along axis C or a rotary "spin" degree of freedom about axis C, and these additional degrees of freedom can be sensed and/or actuated. In addition, a capstan drive mechanism 164 can be coupled to each vertical member 168 to provide mechanical advantage without introducing friction and backlash to the system, and are described in greater detail in co-pending patent application Ser. No. 08/400,233.

Sensors 28 and actuators 30 can be coupled to gimbal mechanism 140 at the link points between members of the apparatus, and can be combined in the same housing of a grounded transducer 174a or 174b. A rotational shaft of actuator and sensor can be coupled to a pulley of capstan drive mechanism 164 to transmit input and output along the associated degree of freedom. User object 34 is shown as a joystick having a grip portion 162 for the user to grasp. A user can move the joystick about axes A and B.

Other embodiments of interface apparatuses and transducers can also be used in interface device 14 to provide mechanical input/output for user object 34. For example, interface apparatuses which provide one or more linear degrees of freedom to user object 34 can be used. Other embodiments of actuators and interfaces are described in co-pending patent applications Ser. No. 08/400,233, (now U.S. Pat. No. 5,767,839) Ser. No. 08/489,068, (now U.S. Pat. No. 5,721,566) Ser. No. 08/560,091, (now U.S. Pat. No. 5.805,140) Ser. No. 08,571,606, and Ser. No. 8/709,012.

Figure 4:
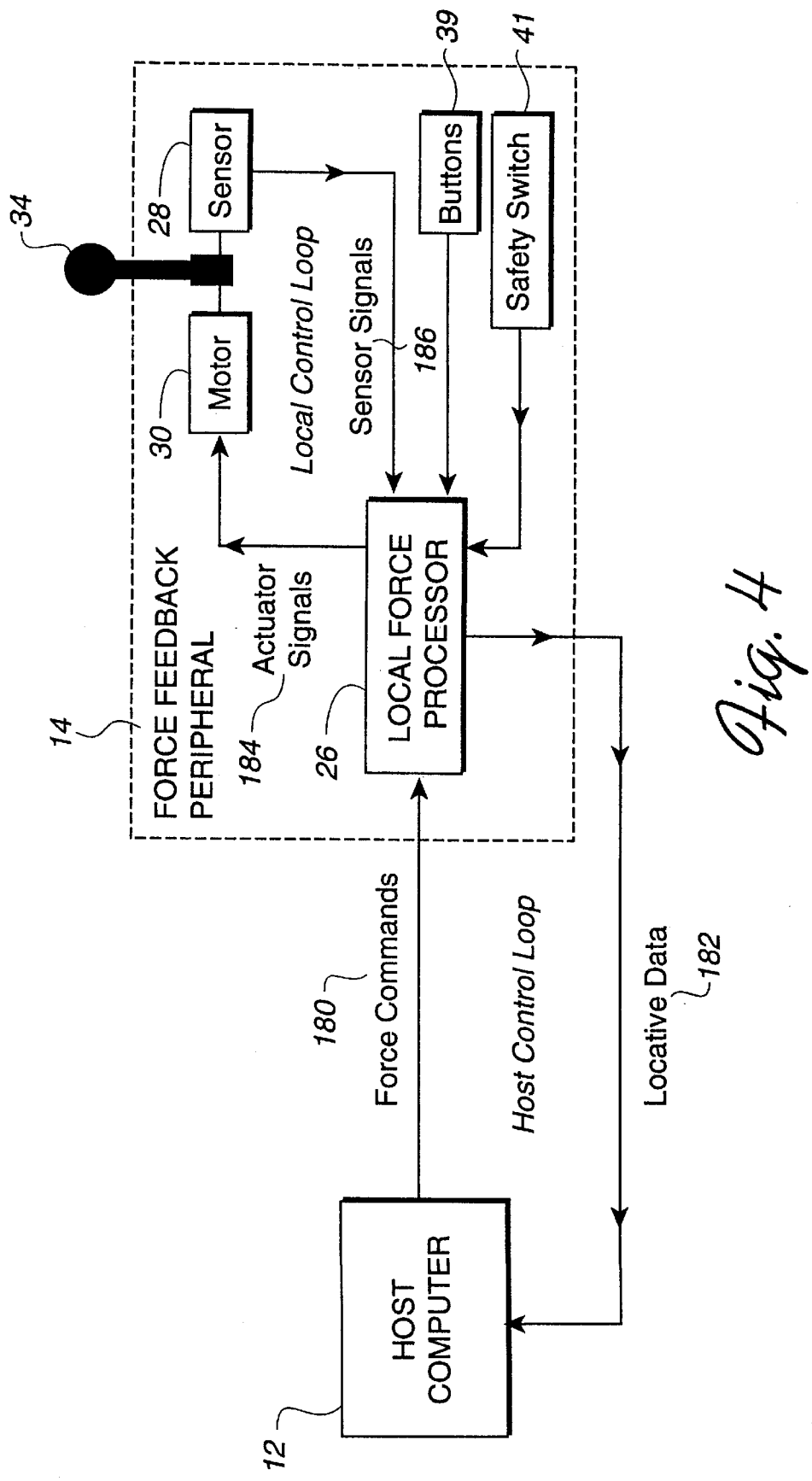
FIG. 4 is a block diagram illustrating a preferred functionality of the force feedback system of FIG. 1.

FIG. 4 is a block diagram illustrating the preferred functionality of the force feedback system 10 of FIG. 1. The force feedback system provides a host control loop of information and a local control loop of information in a distributed control system.

In the host control loop of information, force commands 180 are provided from the host computer to the microprocessor 26 and reported data 182 is provided from the microprocessor 26 to the host computer. In one direction of the host control loop, force commands 180 are output from the host computer to microprocessor 26 and instruct the microprocessor to output a force having specified characteristics. Such characteristics may include the type of force desired, such as a vibration, texture, jolt, groove, obstruction, or other types of forces. Furthermore, the force commands may specify characteristics of the commanded force, such as magnitude, duration, frequency, conditions to cause the force to be applied, spatial range of force, etc. For example, in co-pending patent application Ser. No. 08/566, 282, (now U.S. Pat. No. 5,734,373) a command protocol is disclosed in which a host command includes a command identifier, specifying the type of force, and one or more command parameters, specifying the characteristics of that type of force. The microprocessor decodes or parses the commands according to local software or firmware. In the preferred embodiment, the host computer can also provide other types of host commands to the microprocessor 26 besides force commands, e.g., commands to initiate and characterize the reading of sensor signals and the reporting of locative data derived from the sensor signals to the host computer from the microprocessor, commands to initiate and characterize the reading and reporting of button or other input device signals, etc.

The host computer 12 can also send commands to load data from host computer 12 or another computer readable medium into memory 27 of the microprocessor for later use or to provide information needed for local force feedback determination. For example, the host computer 12 can send data including a "spatial representation" of objects in a graphical user interface or other graphical environment to microprocessor 26, which is data describing the locations of all or some of the graphical objects currently displayed in the graphical environment which are associated with forces and the types of these graphical objects. The microprocessor can store such a spatial representation in memory 27. The microprocessor thus can determine, independently of the host computer, at what positions the user object is interacting with a graphical object having forces associated with it, and thus will know when to output force signals to actuators 30. In the preferred embodiment, only some of the graphical object locations are stored at one time in the limited storage space of the local memory 27, e.g., those graphical objects which are most likely to affect forces on the user object based on its current location. With this spatial representation, it is possible for microprocessor 26 to determine when the user object 34 moves within a region in the graphical environment, independently of the host computer determining when a user-controlled graphical object is within the region in the graphical environment.

In the other direction of the host control loop, the local microprocessor 26 receives the host commands 180 and reports data 182 to the host computer. This data 182 preferably includes locative data (or sensor data) that describes the position of the user object 34 in one or more provided degrees of freedom. In some embodiments, other locative data can also be reported to the host computer, including velocity and/or acceleration data describing the motion of the user object 34. The data 182 can also include data describing the states of buttons 39 and/or the states/positions of other input devices 39 and safety switch 41. The host computer uses the data 182 to update programs executed by the host computer, such as a graphical simulation or environment, video game, graphical user interface, etc.

In the local control loop of information, actuator signals 184 are provided from the microprocessor 26 to actuators 30 and sensor signals 186 are provided from the sensors 28 and other input devices 39 to the microprocessor 26. In one direction, the actuator signals 184 are provided from the microprocessor 26 to the actuators 30 to command the actuators to output a force or force sensation. The microprocessor outputs the actuator signals according to commands received from the host. The microprocessor may directly implement data in the host command, or execute a local process associated with the command. For example, the microprocessor can follow local program instructions (a "force routine") stored in memory 27 and which specify the actuator signals or magnitudes to output that are associated with a particular command from the host such as "Wall". The microprocessor 26 can process inputted sensor signals to independently determine appropriate output actuator signals by following instructions that may be stored in local memory 27 and includes force magnitudes, a force profile or sequence of stored magnitudes or other values, algorithms, or other data. The force process can command distinct force sensations, such as vibrations, textures, jolts, or simulated interactions between displayed objects. Many of these embodiments are described in greater detail in co-pending application 08/566,282 now U.S. Pat. No. 5,734,373. The microprocessor 26, for example, can output the control signals in the form of a force waveform which is transformed into the appropriate form for the actuators by an actuator interface 38. Herein, the term "force sensation" refers to either a single force or a sequence of forces output by the actuators 30 which provide a sensation to the user. For example, vibrations, textures, attractive forces, a single jolt, or a force "groove" are all considered force sensations, as are the dynamic sensations disclosed herein.

In the other direction of the local control loop, the sensors 28 provide sensor signals 186 to the microprocessor 26 indicating a position (or other information) of the user object in degrees of freedom. Signals from other input devices 39 and safety switch 41 can also be input as sensor signals. The microprocessor may use the sensor signals in the local determination of forces to be output on the user object, as well as reporting locative data in data 182 derived from the sensor signals to the host computer that represents the position (or other characteristics) of the user object 34, as explained above. For example, the sensors signals may be processed into the locative data which is in a form suitable for reception by the host computer.

The data 182 reported to the host computer by the microprocessor 26 typically includes a direct representation of the position (or motion) of the user manipulatable object 34 (and/or may also represent the states/conditions of other input device 39). Thus, when the actuators 30 output a force on user object 34, the force moves the user object and changes its position. This new position is detected by the sensors and reported to the microprocessor in sensor signals 186, and the microprocessor in turn reports the new position to the host computer in data 182. The host computer updates an application program according to the newly-received position. Thus, the visual images updated on the screen may be affected by the force sensations, and vice-versa.

The use of microprocessor 26 allows realistic force feedback to be implemented over low bandwidth interfaces. The faster that the sensors 28 are read and the forces are updated using actuators 30, the more realistic and "smooth" is the force sensation. The loop of reading sensors and updating forces, called the "update" rate, should be 500 Hz to 1000 Hz. The microprocessor, being local to the sensors and actuators, can perform the high speed computations in the local control loop necessary for a high update rate. However, the rate of visually updating the images on the display device of the host computer, to coordinate the images with output forces, need only have a low update rate on the order of 100 Hz. The microprocessor 26 can report the sensor data to the host computer in the host control loop at this lower rate over the interface bus 24. The distribution of host command of forces/updating of application program and local processing of forces allows much greater stability and control of forces when communication bandwidth is relatively limited.

In a different, host-controlled embodiment that utilizes microprocessor 26, host computer 12 can provide low-level force commands over bus 24, which microprocessor 26 directly transmits to the actuators. In yet another alternate embodiment, no local microprocessor 26 is included in interface system 10, and host computer 12 directly controls and processes all signals to and from the interface device 14, e.g. the host computer directly controls the forces output by actuators 30 and directly receives sensor signals 186 from sensors 28 and input devices 39.

Force Feedback Sensations

Because force feedback devices can produce such a wide variety of feel sensations, each with its own unique parameters, constraints, and implementation issues, the overall spectrum of force sensations has been divided herein into subsets. Herein, three classes of feel sensations are discussed: spatial conditions ("conditions"), temporal effects ("effects" or "waves"), and dynamic sensations ("dynamics"). Conditions are force sensations that are a function of user motion, effects are force sensations that are a predefined profile played back over time, and dynamics are force sensations that are based on an interactive dynamic model of motion and time.

Conditions

Conditions describe the basic physical properties of an interface device based on spatial motion of the interface. For example, a joystick device has basic properties such as the stiffness, damping, inertia, and friction in the joystick handle. These elementary conditions define the underlying feel of handle motion during general manipulation. Conditions can also be barriers or obstructions ("walls") that restrict spatial manipulation of the stick, and can also be textures. Conditions are very compelling physical sensations because they generate forces as a function of the spatial motion of the interface device as caused by the user. In most applications, conditions are used to tune the general feel of the device based upon provided parameters. For example, when flying an F-16 fighter in a game, a joystick handle might be made to feel very stiff and heavy. When flying an old Spitfire, a joystick handle might be made to feel loose and light. When the craft is damaged by an enemy fire, the joystick handle might be made to feel sticky with a scratchy texture.

Overall, it should be understood that conditions are typically not associated with discrete sudden events during game play or application use, but are rather background conditions or background physical properties of application events, hence the name "conditions." A condition is usually an environmental feel that is set up and experienced over an extended period. For example, when a controlled aircraft lifts off a runway, a set of conditions would be engaged to represent the feel of that particular plane. Such conditions are felt by the user for an extended period, but will be updated as gaming events change. When the wing-flaps are raised, the stick might be made to feel more stiff. In another example, a car is controlled in a driving game. Depending upon what car is being driven, a set of conditions will define the stiffness of the wheel, the range of motion of the wheel, and the damping and friction in the wheel. When the car is air-borne off a jump, these conditions may change to simulate the feel of the free tires. When driving in mud, the conditions may change again. Thus conditions, while typically used over extended periods of time, can be highly tuned to changing game events.

Conditions may create force sensations that are a function of user object position, user velocity, and/or user object acceleration. Preferred standard types of conditions are springs, dampers, inertia, friction, texture, and walls. A spring force is a restoring force that feels like stretching or compressing a spring. A damper force is a drag resistance that feels like moving through a viscous liquid. An inertia force sensation feels as if the user is moving a heavy mass. A friction force sensation is a contact or rubbing resistance that encumbers free motion. A texture is a spatially varying resistance that feels like dragging a stick over a grating. A wall is an obstruction having a specified location that feels like a hard stop or a soft cushion.

Commanding conditions of the above types involves specifying the condition type and defining the unique physical properties associated with that type. These can be specified using the host command identifiers and host command parameters as described above. For example, a basic type of condition is a spring, as specified by the host command identifier, and the fundamental physical property or parameter is the stiffness. The resulting sensation will be a restoring force upon the user object that resists motion away from a spring origin. The stiffness defines how quickly the force increases with motion. Additional parameters can further customize the feel of the spring by adjusting the location of the spring origin by assigning which axis or axes the spring is applied to, by limiting the maximum force output of the spring sensation, etc. All of these physical properties are the parameters for the stiffness sensation. By defining these parameters, a wide variety of feels can be created. By combining multiple springs, even more diverse sensations can be defined. By combining spring sensations with other conditions such as textures and friction, the diversity grows further.

Another parameter is a trigger parameter, which defines when to create the condition sensation. In the simplest case, the condition might be created (triggered) directly upon the call of the host command. In the more advanced case, the condition sensation being defined might be generated (triggered) upon a local event such as the press of a button. Using buttons or other input devices to trigger sensations provides the benefits of "reflexes." Since reflexes are more useful for discrete events rather than background environment, conditions may more often trigger directly upon a host command. Effects, on the other hand, often trigger from button presses as described subsequently.

Spring condition

Figure 5:
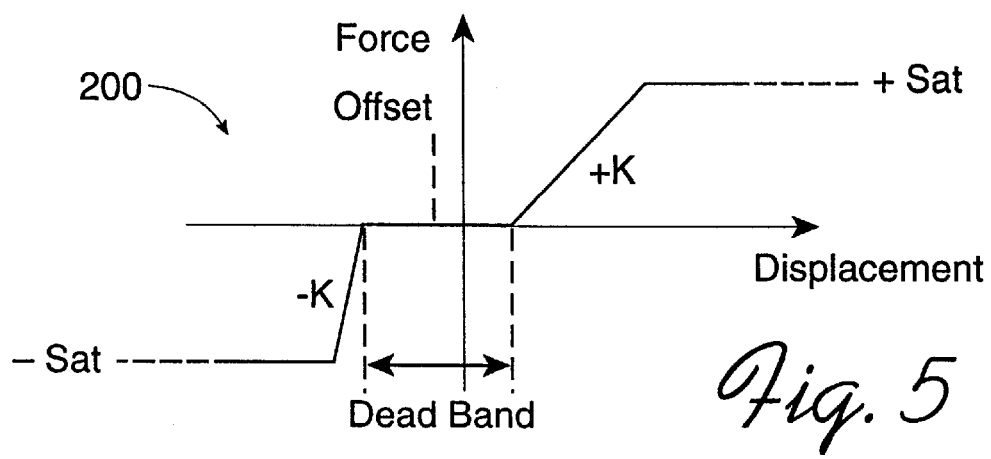
FIG. 5 is a graph showing a force vs. displacement curve for a spring condition.

The spring condition defines a physical property best described as the stiffness of the user object in provided degrees of freedom. A user object axis with a high stiffness will feel as if a strong spring resists displacement of the user object. A user object axis with a low stiffness will feel loose, as if a weak spring resists displacement of the user object. A spring is generally modeled using Hooke's Law $F=kd$, where resistance force (F) is proportional to the displacement (d). The proportionality (k) is generally called the stiffness or "spring constant." Parameters can define and characterize the feel of the spring force sensation. Such parameters may include Stiffness (k) (can be defined for positive and negative displacements of a device axis), Offset (the location of the center of the simulated spring), Saturation (the maximum-minimum allowable force values), Angle (the angle or direction in which the spring is defined), and Deadband (region about origin in which no forces are applied). An example of such a force and the effects of parameters is shown in graph 200 of FIG. 5. Such a force and appropriate parameters are described in greater detail in co-pending patent application Ser. No. 08/566,282 now U.S. Pat. No. 5,734,373.

In addition, multiple spring conditions can be present on a single axis of a force feedback interface device. In such a case, the resisting forces imposed by the springs can simply be summed. If the springs are defined with different offsets, deadband regions, and saturation values, the summation of the multiple springs may give provide different sensations at different positions in the range of travel of the user object, where the resistance may either increase or drop off.

Damping condition

Figure 6:
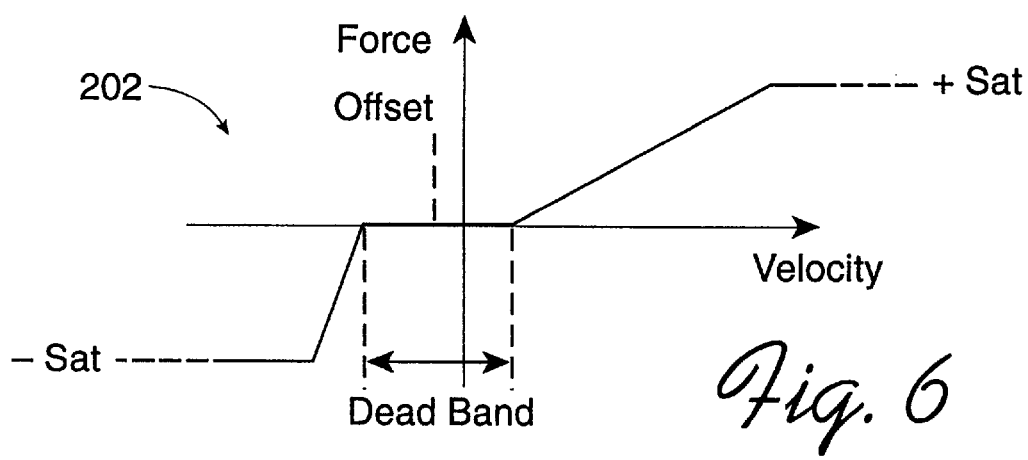
FIG. 6 is a graph showing a force vs. velocity curve for a damper condition.

The damping condition defines a physical property similar to the feel of moving through a viscous fluid. The force for a damper increases with velocity, where the resistance to velocity is the viscous property called "damping." A damper force sensation can be described as a mathematical relationship between force and velocity ($F=bv$), wherein the resistance force (F) is simply proportional to the velocity (v), and the proportionality (b) is generally called the stiffness or "damping constant." As with spring condition, a number of parameters can be used to fine tune the feel of the damping sensation, such as Damping (B) for positive and negative velocities along a device axis. For example, the damper can be defined with a +b and −b such that it is much harder to quickly push the joystick forward than it is to pull it back. Parameters such as Offset, Deadband, and Saturation can be defined for the damper condition similarly as for the spring condition, as shown in graph 202 of FIG. 6.

Inertia Condition

The inertia condition defines a physical property similar to the feel of moving a heavy mass. The user object moved in an axis defined with a high inertia feels heavy, and the user object moved in an axis defined with a low inertia feels light. High inertia can be useful to simulate the feel of piloting a large craft or dragging a heavy weight. The inertia sensation can be modeled using Newton's Law represented as $F=ma$, where the resistance force (F) is proportional to the acceleration (a). The proportionality constant (m) is the mass. To make the user object feel heavy, a large value is used for the mass. To make the user object feel light, a small value (or even a negative value) is used for mass. The parameters for an inertia condition can include the magnitude of mass and the saturation level at which no additional inertial force may be output.

Friction Condition

Figure 7:
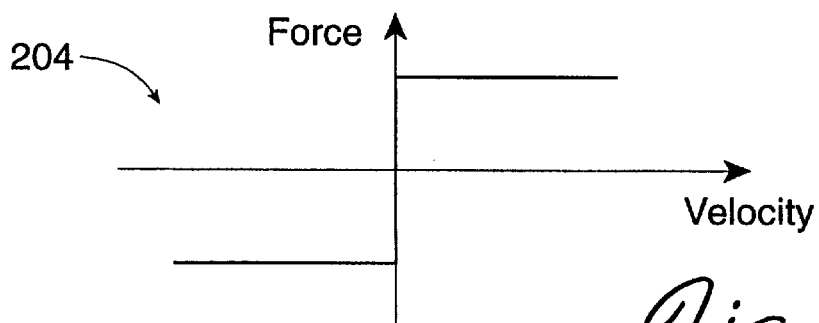
FIG. 7 is a graph showing a force vs. velocity curve for a friction condition.

The friction condition defines a physical resistance sensation representing the feel of sliding an object against a uniform frictional surface. Like damping, friction force always resists the direction of motion. Graph 204 of FIG. 7 shows a force vs. velocity representation of friction. Unlike damping, friction force has a constant magnitude regardless of the velocity. In other words, friction is a force sensation where the direction of the force is dependent upon the sign of the velocity, but the magnitude of the force is constant. The magnitude of the frictional resistance can be defined by a parameter called the friction coefficient. In addition, a number of parameters can be used to fine tune the feel of the friction sensation similar to the conditions described above, for example, friction coefficient (f) and a deadband. Furthermore, different values of friction coefficient (f) can be defined for positive and negative velocities along of a device axis. For example, the friction can be defined with a +f and −f such that it is much harder to turn a steering wheel left than it is to turn it right.

It is important to note that there is a fundamental problem with the simple mathematical model of the friction condition shown in FIG. 7. When the direction of the user object is changed (i.e., changing velocity to the other side the force axis), a sudden, sharp friction force is applied in the new direction, which is usually not desired. Therefore, a simulated friction is preferably provided that has a smooth transition of force when changing direction, such that the force is proportional to velocity when velocity is very small.

Texture Condition

The texture condition is a spatial condition which imparts to the user a feel of "bumps"similar to dragging an object over a rough surface like a metal grating. Textures result in a periodic force signal felt by the user. However, unlike a vibration effect (described below), a texture creates a periodic force signal that varies based on the spatial motion of the user object, whereas vibrations are periodic forces that are output as a simple function of time. In other words, vibrations are predefined routines "played" over time while textures create interactive spatial environments wherein the feel is highly dependent upon user motion.

A number of parameters can be used to tune the feel of a texture sensation. These parameters include Roughness, Spacing, Density, and Orientation. By adjusting each of these values, programmers can define a variety of texture sensations with great flexibility. The meaning of each parameter is described below.

Roughness defines the intensity of the texture sensation. Since this is an interactive effect, the strength of the sensation also depends on how the user moves the interface through the texture environment. Roughness (R) can be analogized to the grit of sandpaper, where the feel depends both on the grit and how the user rubs his or her hand over it. It should be noted that some force feedback devices allow the definition of a positive roughness (+R) and a negative roughness (−R) such that the intensity of the texture depends upon which direction the user object is moving. Spacing defines the center-to-center spacing between the "bumps" in the texture. The smaller the spacing, the finer the texture. Density defines the width of the "bumps" in the texture with a range of 1 to 100, where 50 means 50% of the center-to-center spacing of the bumps. A small density means the bumps are small with respect to the empty space between them. A large density means the bumps are large with respect to the empty space between them. The Orientation of the texture grid can be either horizontal or vertical in each dimension.

Wall Condition

A wall condition creates the feel of encountering a surface within the range of travel of the user object of the interface device. For example, if a force feedback joystick is moved into a simulated wall, the user feels a hard obstacle when the stick is moved perpendicular to the wall (pushed into the wall) and feels a smooth surface when the stick is moved parallel to wall (rubbed along the wall). The wall stops providing resistance forces if the stick is backed away from the wall. The wall re-applies forces if the stick re-encounters the wall. Often, the wall is displayed on the screen and a user controlled graphical object, such as a cursor, interacts or collides with the wall to cause the wall sensation on the user object. For example, the cursor can be controlled by the user object under a position control paradigm, in which movement of the cursor in the graphical environment directly corresponds to movement of the user object in the physical workspace.

Figure 8A:
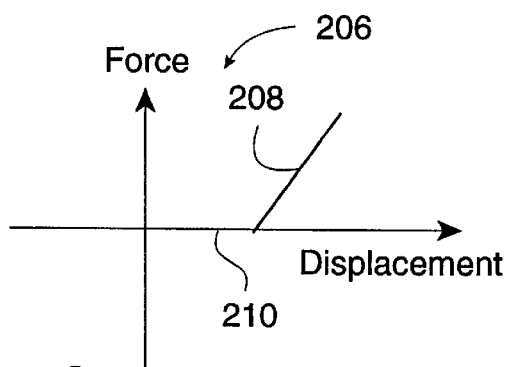
FIG. 8a is a graph showing a force vs. displacement curve for a wall condition.

Mathematically, a wall condition is usually represented as a force that suddenly increases rapidly with displacement of the user object. FIG. 8a is graph 206 showing a representation of a wall in a force vs. displacement graph. If a joystick is moved to the right towards a wall, represented by line 208, no force is applied on the joystick until the joystick moves to the wall location. Once the joystick crosses the location of the wall (where line 208 crosses the displacement axis 210), the resistance force increases very rapidly with displacement, creating a force that pushes back on the joystick and resists the penetration of the wall by the joystick. Line 208 in FIG. 8 represents the relation between force and displacement and is a steep line, representing a force that increases quickly with penetration into the simulated wall. The steeper the force increases with displacement into the wall, the "harder" the wall will feel.

In the present invention, the wall condition has been abstracted to simple parameters that can be rapidly defined by programmers. A wall is defined in terms of its hardness, location, and orientation. There are a number of central parameters that make the wall sensation very diverse, as described below.

Hardness is the basic physical parameter for a wall condition. It describes how rigid or compliant the surface of the wall feels when the user pressed against it. A force feedback device cannot simulate the feel of a truly "rigid" wall because the force output capability of the hardware is limited. For example, most force feedback joysticks made for consumer applications produce, at maximum, less than 1 pound of force. This means when a user pushes a force feedback joystick into a simulated wall, the joystick can only resist penetration with a limited resistance force.

Sense is a binary parameter defined as either positive or negative. A wall with positive sense will resist crossing of the wall when moving in a positive direction along an axis. A wall with negative sense will resist crossing of the wall when moving in a negative direction. Thickness is a parameter that defines the thickness of the wall or barrier.

Puncture is a parameter that controls if and when a user penetrates a wall by overcoming the resistance force. A wall with a low Puncture value will let a user "pop through" the wall when the user only applies a small force into the wall. A wall with a high Puncture value will resist the user's penetration until the joystick gets close to resisting with its maximum force capability.

Through-State is a parameter that determines what happens when the wall is penetrated by the user. Three options are described herein: i) the wall sensation is terminated once the wall is penetrated, ii) the wall sensation is dormant, waiting for the user to return to the original side of the wall at which point it becomes active again, or iii) the wall is flipped, meaning it reverses is sense, so that if a user tries to return to the original side of the wall, the interface device is resisted.

Offset is a parameter that describes the location of the wall and is defined in one of two ways. Either the Offset value is the distance of the wall from the origin of the user object's range of motion (i.e., the center of the user object workspace), or Offset is defined as the distance of the wall from the current location of the user object (i.e., the location of the joystick at the instant that the command is called). In the first instance, Offset is an absolute value and in the second instance the Offset is a relative value. An Offset-Flag can be used to indicate in which sense the offset of the wall is defined. An Angle parameter can be used to define the angle of the wall.

Surface_Friction is a parameter that governs surface damping when the user object is moved along the length of the wall surface. If the Surface_Friction is low, the wall will feel like a smooth surface, like glass or ice. If the Surface_Friction is high, the wall will not feel as smooth, as through it was coated in rubber.

Surface_Texture is a parameter that governs the texture felt when rubbing along the length of the Wall surface. If Surface_Texture is low, the feel of rubbing along the wall will feel very uniform. If the Surface_Texture is high, the feel of rubbing along the wall will feel bumpy, like dragging over a rough concrete. Surface_Texture and Surface_Friction together can define a wide range of sensations from a smooth glass to a bumpy stone.

Clipping is a binary parameter that can be selected by the host to be on or off. When clipping is ON, the peripheral device creates a unique visual illusion that greatly enhances the impression of wall hardness. As described previously, a simulated wall can never be fully rigid, for it will always have some compliance due to the fact that the motors are limited in force output capability. Thus, a user using a force feedback interface device and pushing against a simulated wall will penetrate the wall by some distance. If there is no visual representation of this penetration, it is not noticeable to the user. But, if a graphical object drawn by the host computer is following joystick location and is visually shown to penetrate a graphical wall, the penetration becomes very noticeable. Therefore, it is useful to have a means of creating a visual illusion where the graphical object hits a wall and stops even though the joystick actually penetrates the simulated wall. To achieve this illusion the mapping between the graphical display and joystick position needs to be broken. This is called "clipping." When a peripheral device penetrates a simulated wall, the interface device will normally report position data that reflects the penetration. But, if clipping is turned ON, the data reported from the device will not reflect the penetration into the wall, it will reflect the location of the joystick as if the wall was impenetrable. In other words, clipping causes the peripheral to send false data to the host—data that makes the wall seem rigid even though it is not. This is very useful for graphical simulations where walls are used as real boundaries that objects can not move beyond. Clipping is described in greater detail in parent application Ser. No. 08/664,086.

Pressure Mode is another binary parameter than can be either On or Off. Penetration into a wall can be viewed as a measure of how hard a user is pushing against the surface of the wall. This is because the harder a user pushes against a simulated wall, the deeper the joystick will penetrate into that wall. Having a measure of how hard the user is pushing against the wall (pressure) is useful to increase the realism of wall interactions. For example, if one is dragging a finger lightly against a wall surface, the rubbing sensation will be very different than if one is pushing hard against the wall while dragging. The friction and the texture will feel stronger if one is pushing hard. Thus, when Pressure Mode is on, the simulated wall can produce this same relationship between moving along the length of the wall and pushing into the wall. Pressure Mode makes the intensity of the rubbing Friction and rubbing Texture proportional to how hard the user is pushing into the wall. Thus, when the user pushes the user object hard against the wall, friction and texture along the wall surface will feel stronger than when the user only lightly pushes the user object into the wall. This creates a very realistic wall sensation, especially when used in combination with clipping.

The Enclosure parameter provides a rectangular region defined by 4 walls. Each of the wall surfaces has all of the parameters described in the wall command above. Each wall can have its own stiffness, texture, damping, through-state, etc. There are also some additional parameters unique to the enclosure itself. Replicate is an on-or-off flag parameter which indicates if the enclosure should call another enclosure when a user pops out of one side, the new enclosure being simulated at a position next to the first enclosure. This provides the ability to create a column, row, or table of enclosures.

A Scroll_Surface command is a type of wall condition that includes parameters of direction, sense, trigger, offset, hardness, friction, surface texture, off-distance, through-state, clipping, and pressure-mode, like the wall command described above. This command creates a horizontal or vertical wall (specified by the direction parameter) passing through the location of the cursor (location when the call is received) or a location offset from the current location. The wall will feel like a hard surface when puck is moved perpendicularly into the wall. The harder one pushes against the wall (measured as penetration into the surface), the larger the Push_Valuator value generated. This value will be sent back to the computer and used by the host control the rate of scrolling text, zooming images, etc. When moved parallel to the surface, the scroll surface will not change and it will feel like a smooth or textured surface. The location of the wall is remembered if the user pulls the user object back from the wall within a predetermined range of the wall (the off-distance parameter), so that the wall will present forces when re-engaged by the user object. When the user object is moved away from the wall past the predefined range, the wall turns off and the microprocessor does not retain memory of the scroll surface location. The Direction parameter indicates whether a horizontal or vertical scroll surface is defined. The Trigger parameter indicates if a trigger should be used to indicate that surface be engaged, such as one of multiple buttons on the user object or interface device. The Scroll_Surface command is useful for turning the edge of a window or the edge of a screen into an input means for controlling scrolling, zooming, panning, or other analog functions. The Pop command (described below) can be used in conjunction with the Scroll_Surface to give haptic "ticks" when pages or other elements scroll by or when the limits of a zoom or pan function are reached in a graphical user interface.

Barrier Condition

Barrier is a condition, similar to a wall, that creates the feel of encountering a hard surface within the range of travel of the user object 34. Unlike a wall, a barrier is a simulated obstacle that can be penetrated. For example, if a joystick is moved into a simulated barrier, a hard obstacle force is provided when the joysstick is moved perpendicular to the barrier (pushed into the barrier). If the joystick is forced into the barrier with enough force, it will penetrate and thereby "pop" to the other side. Preferably, the barrier has a positive hardness parameter and a negative hardness parameter which define the feel of the barrier depending upon which direction it is approached. Also, the barrier sensation can include a thickness parameter that defines how difficult or easy it is to penetrate.

Figure 8B:
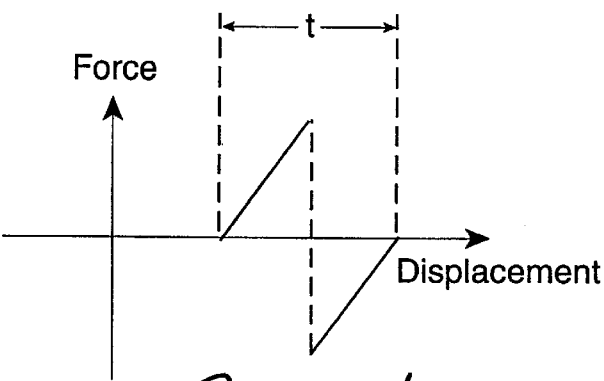
FIG. 8b is a graph showing a force vs. displacement curve for a barrier condition.

As shown in graph 214 of FIG. 8*b*, a barrier is represented as a force that increases sharply with displacement at the location of the barrier when crossed from a given direction, as shown by angled lines 216 and 21 8, similar to the wall of FIG. 8*a*. If the user pushes against the barrier with enough force to cause the user object to penetrate by half the thickness (t) of the barrier, the force profile will flip direction thereby "popping" the user to the other side. Thus, a user object starts at the center of its workspace and is moved to the right. No force is felt on the user object until the barrier is encountered at line 216. The force resists penetration until the joystick penetrates the barrier by half the thickness distance (t). Then, the force reverses in direction and the user object "pops" to the other side at point 219. If the user object now approaches the barrier from the right side of the barrier, the force again resists penetration until the user object "pops" back to the left side of the barrier.

Like the wall condition, the barrier condition has been abstracted to simple parameters, such as Positive Hardness and Negative Hardness defining the rigidity or compliance of the surface of the barrier in the positive and negative directions, respectively; Thickness defining the distance into the barrier the user needs to push before "popping through" to the other side, where the user needs to push into the barrier by half the thickness in order to pop to the other side; and Offset, Surface Friction, and Surface Texture for defining characteristics of the barrier similarly to the wall condition described above.

Temporal Effects

Effects are force sensations that are closely correlated with discrete temporal events during game play. For example, a shuttlecraft is blasted by an alien laser, the user feels a physical blast that is synchronized with graphics and sound that also represent the event. The jolt will likely have a predefined duration and possible have other parameters that describe the physical feel of the event. The blast may even be represented by a complex force profile that defines a feel unique to the weapon that was fired. While discrete, effects can have a substantial duration—for example, if a small motor boat is caught in the wake of a huge tanker, the bobbing sensation may be an effect that lasts over an extended period and may vary over time.

Effects are best thought of as predefined functions of time such as vibrations and jolts that are "overlaid" on top of the background conditions described above as foreground sensations. In other words, effects are forces that are defined and "played back" over time when called. For example, in the driving example given above, a given car may have conditions that define the "feel" of the wheel when such as the stiffness, damping, and friction in the wheel. But, when the car hits a pot hole or bumps another car, the discrete jolt that is overlaid on top of the background sensations are effects. In addition, the subtle motor-hum that is felt as the engine is revved is another effect overlaid on top of the background conditions.

The biggest drawback of effects is that they are predefined sensations that are simply played back over time. While conditions are highly interactive sensations that respond to user motion, effects are canned force profiles that execute the same, regardless of how the user responds. Nevertheless, effects can be very effective when coordinated with application program events. The key is to use effects only where appropriate and to use conditions and dynamics to provide interactive richness for the user.

Effects fall into two classes as described herein: a) Force Signals and b) Force Profiles. A Force Signal is an effect that is defined based on a mathematical relationship between force and time. This mathematical relationship is defined using waveform conventions. For example, a Force Signal might be defined as a force that varies with time based on a sine-wave of a given frequency and magnitude to create a vibration sensation. A Force Profile is an Effect that is defined based on a stream of digitized data. This is simply a list of force samples that are stored and played back over time. Using Force Signals, a complex sensation can be defined based on simple parameters such as Sine-Wave, 50 Hz, 50% magnitude. An advantage of Force Profiles is that they allow for more general shapes of forces, but require a significant amount of data to be transferred to and stored at the interface device 14.

Many force effects can be created by having actuators generate time-varying force signals upon a force feedback device. The form and shape of the resulting wave has great influence upon the "feel" experienced by the user. For example, a convenient way of defining force effects is by parameters such as source, magnitude, period, duration, offset, and phase. The source is basically the mathematical foundation for the force versus time relationship, and can be a constant force or a basic periodic waveform such as a sine-wave, triangle-wave, square-wave and saw-tooth wave. Magnitude scales the source based on a percentage of full capability of the given hardware device. Period defines the time for a single cycle of the waveform to be played and is defined as 1/frequency of the resulting waveform. Duration defines how long the periodic signal should be played, Offset defines the location of the center of the waveform as shifted in the magnitude domain, Direction determines in which direction(s) or degrees of freedom the effect is applied, and Phase defines the time offset of the waveform.

Figure 9:
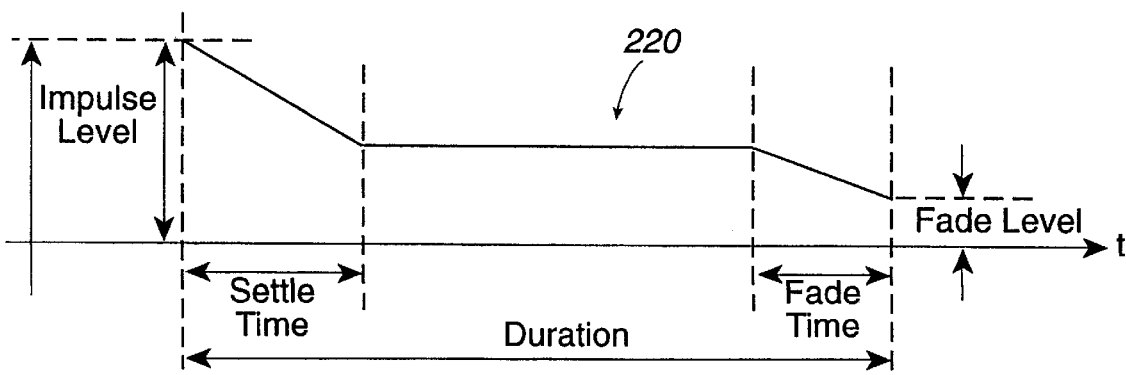
FIG. 9 is a graph showing a force vs. displacement curve for an effect.

Once a waveform is defined, its shape can be adjusted using an envelope. Wave shaping is described in greater detail in co-pending patent application Ser. No. 08/747,841, incorporated by reference herein. Preferably, only those variables that have significant impact upon human perception of the resulting sensation are manipulated to minimize the computational burden of representing the effects. For example, parameters such as Impulse Level and Settle Time, Fade Level and Fade Time can be provided to shape the waveform. These parameters are shown graphically with reference to graph 220 of FIG. 9. Since human physical senses are most sensitive to changes in force intensity (called "transients" or "impulses") and least sensitive to constant forces or slowly changing forces, the most important parameters to adjust are those that allow the programmer to accentuate the sharp transitions in force level. Impulse Level is a variable (defined as a percentage of full) that describes how much initial magnitude of force should be delivered upon initiation of the effect to accentuate the transient, and the Settle Time is a variable (defined as a duration) that describes how quickly the Force Signal will settle from the Impulse Level to the steady state magnitude. Together these two parameters define an effective envelope for force signals that represents the primary perceptual qualities of feel sensations. This wave shaping lets one take full advantage of the limited dynamic range of force feedback hardware devices. Other parameters which can extend the flexibility of the impulse wave shaping paradigm can also be used. Fade Level and Fade Time are analogous the Impulse Level and Settle Time but are applied at the tailing end rather than at the onset of a Force Signal. Fade Level defines the final force level to be output and Fade Time defines how long it takes for the steady state value to decay to that level.

Effects may also have Application parameters that describe how the resulting signal is applied to the given device. Application parameters may be a direction in vector space or may be an "axis mask" that defines one or more device axes or degrees of freedom for signal application. Effects may also have Trigger parameters that indicate when to execute a defined effect. Many effects may simply trigger (execute) upon being called by the host computer. Other effects may trigger automatically when a given button is pressed on the device. This automatic execution of an effect is called a reflex and is helpful in reducing the communication burden for effects that occur very frequently such as "gun recoil" sensations. For example, the parameter Button Mask defines which button(s) should trigger a specified effect. The parameter Repeat Delay defines the time the delay between multiple executions of a given effect when a button is held down for an extended period.

In addition, a single complex effect can be specified as a sequential combination of multiple simpler effects. For example, the feel of lowering the landing gear on a fighter plane might be described as a sharp jolt (when the hatch opens) followed by a high-frequency vibration hum sensation (as the gear is being lowered), followed by a sharp shock in the opposite direction (as the gear locks into place). Such an effect is a sequence of distinct and unique components that are sequenced together as a single meaningful unit—a compound effect. Each component may have its own effect parameters that describe Magnitude, Direction, Duration, etc., of that component. The compound effect may also have parameters such as Magnitude and Duration that scale component values, allowing for a Compound Effect, once created, to be executed with parametrized variability. In the above example, a compound effect can be thought of as follows: Gear_Effect=[Jolt-Effect→Hum_Effect→Shock_Effect].

Three basic types of effects are periodic, constant force, and ramp. The periodic type of effect is the basic effect described above, in which a signal source such as a sine wave, triangle wave, square wave, etc., has a frequency and amplitude and may be shaped for a specific application. A vibration is the most common type of periodic force. A constant force is simply a constant magnitude output over time, but also may be shaped using the envelope parameters discussed above to achieve a waveform that is shaped like the envelope. A ramp is simply a rising force magnitude followed by a falling force magnitude, and can be defined as a single half cycle of a triangle wave or other waveform.

A periodic sweep is similar to a periodic effect, except the direction of the force changes during the application of the periodic sweep. For example, a start direction or orientation (Start_Angle) of the force is assigned as one parameter, and an end direction (Stop_Angle) of the force is assigned as another parameter. The start direction might be, for example, in the positive direction on the x-axis (0 degrees), and the end direction might be the negative direction on the x-axis (180 degrees). The microprocessor sweeps the direction of the output force between the two directions during the output of the periodic force. The sweep is preferably evenly distributed (i.e., swept at a constant rate) throughout the duration of the periodic force, unless the user further characterizes the sweep using parameters (for example, and exponential sweep might be commanded with an appropriate parameter, where the rate of change in direction increases as the periodic force is output).

A vector force effect is a single force having magnitude, direction, and duration parameters and can be used for a variety of purposes, such as to signify an event occurring in the host application program, to simulate an impact, to inform the user of a spatial layout in a graphical environment, etc. Optionally, a vector force may be shaped as described above during its duration. Vector forces can be used when a particular output force does not easily fit into any of the predefined types of force sensations. One use of vector forces is when the host computer controls output force sensations directly, without using a predefined force implemented by microprocessor 26. For example, the host computer can output a particular or unique force sensation using a series of vector force commands that output forces in desired directions and magnitudes. In the preferred embodiment, a "streaming mode" is implemented on interface device 14 which allows efficient transmission of vector force commands from the host computer. For example, such a mode is appropriate for use with the USB bus connecting the host computer to the interface device, which includes an "isochronous mode" for fast streaming of smaller packets of data because no handshaking parameters or signals are required in this mode (i.e., the data is streamed without requiring handshaking signals between each data packet). Such a mode allows vector forces directly commanded from the host computer 12 to be output very quickly, thus increasing the fidelity of host controlled forces commanded using vector force commands. Microprocessor 26 can output vector forces in other situations.

Other effects include Pop, is a command to create an effect sensation similar to a vector force and has magnitude and duration parameters, but does not have a direction associated with it. Instead, a Pop is a single cycle of a periodic wave simultaneously occurring in two (or more) axes or degrees of freedom. The result is a tactile stimuli that is neutral, having no direction. This sensation can be used to indicate that something has been encountered. For example, entering or exiting a window or clicking on a button can each have a pop associated with it. This sensation is useful for small buttons that can be missed, since the pop lets the user know the button is pressed. When a drag-and-drop operation is performed in a graphical user interface and a file is dropped into a folder, a pop can signify the drop. A pop can also be used to indicate opening or displaying a menu and/or to indicate transitions between highlighted menu items.

A Smart Pop command is similar to a Pop command but causes a force sensation having a direction that is exactly opposite the current direction of motion of the user object. This command is useful to provide a directional jolt commanded by the host computer without requiring the host computer to read the current direction of the user object and calculate a direction that the jolt should be applied: it is simply applied in the opposite direction to the current direction the user object as determined in real time by microprocessor 26. For example, Smart Pop may provide a jolt sensation of crossing into or out of a graphical window while moving at a skewed angle relative to the edge of the window without the host computer requiring the direction that the user object is moving and without needing to compute the direction in which the jolt should be applied.

Dynamic Sensations

Dynamics provide interactive force sensations made possible by advances in the hardware processors employed within force feedback devices. Dynamic sensations provide greater ability to interact with graphical environments during a force sensation and in a physical manner. With the new level of realism provided by force feedback with dynamic sensations, feel becomes not just a embellishment but an integral part of the gaming experience.

Dynamics are force feedback sensations generated based on real-time dynamic simulations of physical systems. Dynamic sensations let users take advantage of their inherent sensory motor skill and dexterity to optimize their control when interacting with software. This allows computer-implemented games to take on a level of physicality reminiscent of real sports. For example, a ball impacting a racquet, compressing the strings, and then bouncing off with a snap is one dynamic sensation that provides critical real time information that allows players of racquet sports to impart subtle control over the ball. This sensation cannot be easily represented by a simple force profile that is predefined and played back over time, since the manner in which the user interacts with the ball during the event greatly changes the feel of the event. The user, for example, might cushion the ball to a halt by absorbing energy in the wrist, could whip the ball sharply off the paddle by tightening the wrist with a snap, or could sling the ball off to the side with a flick of the arm. Although the entire event may only last 500 milliseconds, the subtle feel of the continuously changing forces during the interaction is very important to making a realistic sensation. For example, the following force sensations become possible: the feel of a ball impacting a racquet, compressing the strings, and then bouncing off with a final snap; the feel of wading through a thick pool of swamp-muck that "jiggles" as the player struggles, making it difficult to move straight; the feel of swinging a boulder on the end of a cable—the faster the boulder spins, the harder it tugs until the player lets go, letting it fly; the feel of an asteroid as it dives into the force field surrounding a space ship and is deflected by quick maneuvering skills. Conditions and effects are incapable of supporting these types of real-time physical interactions based on user motion and a physical system. Dynamic sensations can not be represented by a stored, predefined profile that is simply played back over time.

All of the above sensations have one important thing in common: how the user reacts during the sensation event has a significant effect on the feel of the event. This is because the above examples all involve real-time physical interactions based on 1) user motion as well as 2) a physical system wherein user motion during the interaction affects the behavior of the physical system. For example, if the user wades through swamp-muck in a violent manner that stirs up undulations in the fluid, the user's rash motions will increase the difficulty of travel because the undulations in the fluid will worsen as the user struggles. But, if the user wades through the swamp-muck in a dexterous manner that absorbs the undulations in the fluid, the user will have an easier time passing through the muck. This example, like all interactions with physical systems, demonstrates that how the user influences the system during the event will effect how the event feels. When feel is influenced by user actions, the realism of gaming and other application environments is enhanced to a new level.

The hardware of the present invention preferably includes a dynamic processing routine ("dynamic routine" or "dynamic force routine"), which is a local software engine or set of program instructions executing on microprocessor 26 (and which can be stored in local memory 27, for example) that allows complex dynamic sensations of the present invention to be executed at high speeds in parallel with host execution of application program events. High level commands allow the host computer to coordinate the feel and execution of the dynamic sensations with gaming or other application program interactions. For example, parameters can be sent to the interface device 14 under Direct-X 5.0. Preferably, the host computer sends out initial conditions to the microprocessor 26 in the host command (or following an initial host command), receives data from the microprocessor from interim reporting during the dynamic sensation, and receives a final report of data at the end of the dynamic simulation. This is described in greater detail below.

The dynamic simulation of the physical system used to generate the feel of a ball bouncing off a paddle or other effects needs to run very quickly in order to provide a sensation that is not corrupted by lag. For example, the software that runs the dynamic simulation needs to read sensor position, update location of the paddle, compute the dynamic interaction between the paddle and the ball, compute the resultant forces to be felt by the user, and send those forces to the motors of the interface device every few milliseconds. If the host computer was to perform the dynamic simulation, this process would also include the steps of reading sensor data from the interface device across the communication bus and sending force command back to the interface device across the communication bus. This would be a computational burden for the host and a bottleneck for the communication bus. Thus, the microprocessor 26 preferably performs the dynamic simulation locally using the dynamic routine. All a programmer of force feedback sensations need do to set up the dynamic simulation is send a command and simple parameters defining the dynamic sensation from the host computer 12 to the interface device 14. The implementation of the dynamic sensations is performed locally to the interface device in parallel with gaming execution and independently of the knowledge of the host application program or any other program of the host, thus minimizing the impact upon the speed of the host application.

Each dynamic sensation sets up a physical sensation within the local processing routine of the interface device. Parameters defined by the programmer can tune the dynamic sensation for specific application events. The basic types of dynamic sensations are described in detail subsequently, and include Dynamic Control Law, Dynamic Recoil, Dynamic Impact, Dynamic Liquid. Dynamic Inertia, and Dynamic Center Drift.

For discrete dynamic events such as impacts and recoils, or for dynamic environments such as dynamic liquid and dynamic inertia, the host sends parameters to the dynamic routine and the hardware executes the complex sensation in parallel to events occurring in the host application program. However, for more complex feel simulations that are coordinated in real time with dynamic graphical events shown on the display 20, the host application program needs update positions during the dynamic simulation performed by the dynamic routine. This updating is called interim reporting, and enables two additional dynamic sensations, Dynamic Sling and Dynamic Paddle.

Interim reporting allows the dynamic routine to report to the host the location of the simulated mass used by the dynamic feel sensation at discrete time intervals during the sensation in addition to reporting the location of the user object. While the dynamic routine might be performing the dynamic simulation with an internal update rate as high as about 1000 Hz required for realistic force sensations, the host computer does not need such rapid update for graphical display. Instead, the dynamic routine reports data back to the host on the order of 60–100 Hz, sufficient for visualization of the event. In addition to reporting interim mass location values during a dynamic simulation, it is also valuable for the dynamic routine to report the final position and final velocity of the simulated mass at the end of the interaction.

For example, the dynamic routine easily implements a ball-on-paddle dynamic sensation, where the graphical display of a ball compressing and bouncing off a paddle is coordinated with the dynamic feel simulation of a ball-paddle interaction. When the simulated ball first impacts the simulated paddle, the host configures the dynamic event by sending information about the simulated physics event to the dynamic routine. Parameters such as the mass of the ball, the incoming velocity of the ball, the compliance of the paddle, and the inherent damping of the paddle are conveyed. The dynamic routine then simulates the event, taking control over the simulation from the host. In real time, the ball compresses the paddle while the user simultaneously moves the paddle in response. Based on the momentum of the paddle, the compliance and damping of the paddle, and the motions made by the user, the dynamic routine computes the simulated location of the ball in real time. Based on that simulated location and the stretch of the paddle, the dynamic routine creates the appropriate and realistic feel sensation. At regular time intervals during this complex interaction, the dynamic routine reports ball location and paddle location back to the host computer. These interim reports are used by the host computer to update the graphics and create a visual display that corresponds with the complex feel. When the ball leaves the paddle, the event is over and the dynamic routine returns control of the simulation to the host computer by reporting the final velocity of the ball as it leaves the paddle. The result is a well-coordinated graphical and physical simulation where the high speed computations required for feel simulation are accomplished local to the interface device and therefore do not slow down the host application.

Dynamic Control Law

A number of different types of primary dynamic sensations are described subsequently. Each of these dynamic sensations is preferably implemented by the microprocessor and dynamic routine in terms of the basic dynamic sensation, herein called the Dynamic Control Law. This is real-time dynamic simulation of a physical system that takes into account how user moves during the interaction. The Dynamic Control Law implements a physical model that is characterized by each of the types of dynamic sensations in a different way. In addition, a programmer or developer may directly adjust parameters of the Dynamic Control Law to allow a more direct, low-level control and characterization of dynamic sensations.

Figure 10:
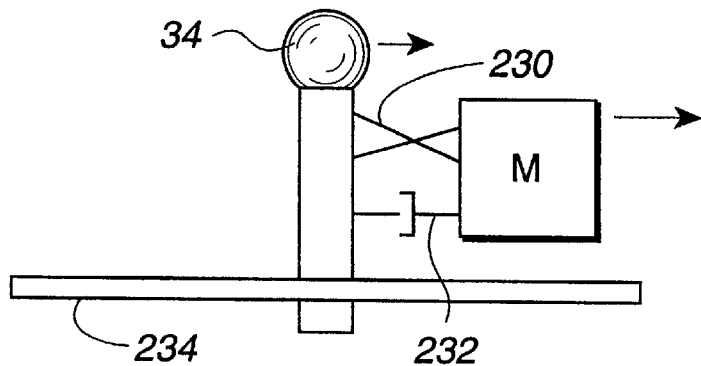
FIG. 10 is a diagrammatic representation of a physical system used in the dynamic sensations of the present invention.

The Dynamic Control Law is best conceptualized by referring to the physical simulation that is being implemented by the dynamic routine, as shown diagrammatically in FIG. 10. This simulation includes a dynamic mass M that is connected to the user object 34 by a simulated spring 230 and a simulated damper 232. User object 34 may move in a degree of freedom designated by ground 234. It should be noted that although FIG. 10 shows one dimension, the Dynamic Control Law can be extended to two dimensions for 2D interface devices and three dimensions for 3D interface devices.

When the user object 34 moves, the simulated mass M moves because the spring and the damper link the two systems "physically." Depending upon how the mass, the spring, and the damper parameters are defined, the mass M might jiggle, jerk, or sluggishly lag behind the user object. Also, there are initial conditions that can be defined to help tune the feel sensation, include the initial position of the mass with respect to an origin, where the origin is typically the user object (this defines an initial stretch of the spring); and an initial velocity of the mass with respect to the user object. Finally, there is an ambient damping parameter that defines the simulated medium that the mass is moving in. A high ambient damping implies the mass is in a thick fluid, while a low ambient damping implies the mass is in a medium such as air having a low damping friction.

Below is a brief description of each parameter used by the Dynamic Control Law sensation:

Dynamic Mass: The mass of dynamic body M coupled to the user object.

Dynamic Stiffness: The stiffness of a spring between the user object and the dynamic body (can be specified in positive and/or negative directions on an axis).

Dynamic Damping: A damping resistance on the user object based on the relative velocity between the dynamic body and the user object.

Ambient Damping (or Drag): A damping resistance on the dynamic body with respect to environment or a fixed frame Initial Velocity: The initial velocity of the dynamic body upon onset of the sensation with respect to the user object, having a direction and a magnitude.

Initial Position: The initial position of the dynamic body with respect to the user object handle defined upon onset of the sensation. This position can be defined in one, two, or three dimensions.

Deadband: The slop or play that is artificially induced between the dynamic body and user object.

Gravity: Any ambient gravitational force felt by the mass; may be positive or negative and includes direction and magnitude components.

Length: Length of the simulated attachment between user object and simulated mass:

determines amount of free play between them.

HalfCycles: a type of duration, where the sensation ends after the specified number of oscillations (or may be defined as indefinite duration). Alternatively, the duration can be specified in a time unit such as seconds; however, the duration or forces of a dynamic sensation cannot often be predicted in terms of seconds due to the user influence on the forces.

Interim Reporting: Flags that indicate whether to report positions of the simulated mass to the host computer intermittently. The rate of reporting positions can also be specified in the command as a parameter.

The dynamic routine determines the forces acting on the simulated mass M based on the parameters described above. The motion of the mass M is primarily affected by four forces: the force generated by the spring 230, the force generated by the damper 232, the force generated by the ambient damper, and the force generated by the gravity. The spring and damper forces are determined similarly to these forces described earlier, and the gravity force is determined using well known formulas. These forces on mass M are summed by the dynamic routine to determine a resultant force on the mass M. From this resultant force, the acceleration of the mass is determined using F=ma. From this determined acceleration of the mass M, the velocity of the mass at given time intervals is determined. From the determined velocity of the mass, the position of mass M at given time intervals is determined. Thus, the dynamic motion of the mass M, defined by its acceleration, velocity, and position, is determined in real time from the multiple forces acting on the mass.

The four forces that primarily affect the mass M are determined based on both dynamic motion of mass M and the motion of the user object 34. For example, the force from spring 230 on mass M is determined based on a spring constant K (stiffness) and the relative distance between the user object and the mass, i.e., the displacement of the mass with respect to the user object. The force resulting from damper 232 on mass M is determined based on a relative velocity between the mass and the user object, i.e., the velocity of the mass with respect to the user object. Thus, these forces are highly dependent on the motion of the user object. The user can significantly affect the resulting force on the mass M by moving the user object so that the relative position and/or the relative velocity between user object and mass M changes. The user's interactions with the physical system greatly influence how the mass behaves in the physical system.

Since the user may excite the mass M by manipulating user object 34, the user in turn feels the effect of this excitation. Any force on mass M resulting from the spring 230 and the damper 232 is applied in an equal an opposite direction to the user object 34. Thus, the force on the user object is the sum of the spring 230 force and the damper 232 forces, but in the opposite direction to the forces on the mass M. The forces on mass M from the ambient damper and gravity are not directly experienced by the user object 34.

The resulting system creates a causal, dependent relationship between forces on the user object and the simulated mass. The user inputs forces and moves the user object, which causes forces on mass M and changes the relative position and/or velocity between user object and mass. The mass M, in turn, causes forces on the user object as a result of the user object movement. In short, the forces on the mass depend on the motion of the user object, and the forces on the user object depend on the motion of the simulated mass. Thus, if the user excites or disturbs the mass, the user feels the results of that excitation or disturbance. This allows the user to influence forces and feel the result of that influence during the dynamic force sensations of the present invention.

Since the forces on the user object are dependent on the excitation of the mass M, a force on the user object can be initiated by the force feedback system without waiting for the user to move the user object. Such forces are initiated by exciting the mass M using the parameters initial velocity and initial position. This allows the force sensation to be initially imposed on the user object and allows the user to move the user object in reaction to the imposed forces.

Other forces also influence the motion of the simulated mass. Unlike the forces caused by simulated spring 230 and simulated damper 232 forces, the force resulting from the ambient damper is based on absolute velocity of the mass with respect to ground. Similarly, the force resulting from the simulated gravity is based on absolute acceleration of the mass with respect to ground. Thus, these forces are not based on the motion of the user object 34, but only on the motion of mass M. However, since the motion of the mass M is in part influenced by the user, the user can indirectly influence and experience the forces from ambient damping and gravity as well, but these forces are experienced only as transmitted though spring 230 and damper 232.

Other forces may also be provided to act on the simulated physical system. For example, conditions and effects can be output simultaneously with the implementation of a dynamic sensation. Since the conditions and effects impose forces directly upon the user object, these forces cause the user object to move, which ultimately influences the motion of the simulated mass and thus the dynamic sensation. For example, a sine wave effect can be output on the user object, and the simulated mass M would be excited from the motion of the user object caused by the sine wave.

Using the basic Dynamic Control Law physical model, each of the other types of dynamic sensations can be modelled by implementing higher-level parameters that are specific to each type of dynamic sensation. In the present invention, parameters pertinent to each type of dynamic sensation have been defined for the ease of the programmer, and these parameters are mapped to the more generic, low-level Dynamic Control Law parameters described above when implemented by the dynamic routine. The mappings for the dynamic sensations are described with reference to each dynamic sensation described below. The mappings provided below may specify only mappings to some of the Dynamic Control Law parameters; preferably, for these dynamic sensations, unlisted Dynamic Control Law parameters are a default or zero value.

In addition, the Dynamic Control Law command lets the advanced programmer control the dynamic routine directly by defining the Dynamic Control Law parameters at the lowest level. This would be typically used by an ambitious programmer who wishes to go beyond the predefined dynamic sensations and achieve the most general sensations possible within dynamic routine and hardware limitations.

Dynamic Recoil

Recoil is a sensation is a common sensation used typically in gaming applications wherein a weapon is fired and a feel sensation of the "kick-back" is output to the user as force feedback. The simplest recoil sensation is just a predefined and played-back jolt, a force of a given magnitude played over time. A more complex recoil sensation might be force profile defined as scripted force variation over time, or may include a canned vibration profile to simulate the feel of weapon resonating after firing. In all such cases, the canned effects may be complex to create but they still lack realism because the jolts, profiles, or vibrations are merely predefined scripts played over time, regardless of user interaction. In other words, such predefined routines do not vary dynamically based on how the user resists motion during the interaction. For example, if the user tenses his grip during a kick, the canned recoil will not feel any different than if the user cushions the blow with a loose grip. In the real world, a tense grip would result in a more abrupt recoil sensation with a high frequency resonance. A loose grip would cause a less jarring recoil with a slow resonance that quickly fades away. Thus, the user's reaction to the blast, through grip and hand motion, should greatly influence the recoil response of the simulated weapon if high realism is to be integrated into the force sensation.

The Dynamic Recoil sensation of the present invention defines recoil sensations not as a scripted profile but as a dynamic model that accounts for the user's real time manual response to the recoil. Dynamic Recoil takes advantage of the dynamic routine to define the feel of a weapon fire. The programmer defines the dynamic properties of the weapon and lets the dynamic routine generate the detailed force profile in real time based on how the user reacts.

The result is a complex sensation that is easy to define and that changes appropriately based on user actions, and which makes the weapon fire an interactive physical event. Experienced players can learn how to cushion the blow, thereby limiting the effect that the recoil may have on play and rewarding skill in game play. The following parameters can be used in Dynamic Recoil. Other parameters may also be used as appropriate.

Blast Direction defines the direction that the weapon is being fired in the graphical environment.

Blast Intensity defines the overall strength of the blast or shot from the weapon.

Dynamic Mass defines the simulated physical mass of the weapon used by the dynamic routine. A weapon defined with large dynamic mass will recoil as if it were heavy, having a strong kick that is difficult to counter. A weapon defined with a small mass will recoil as if it were light and easy to wield, being very controllable during kick-back.

Blast Resonance defines how the simulated mass will resonate after the shock of the initial blast. A high resonance parameter will result in a violent shaking after the initial blast. A low resonance parameter will result in a light tremble. The user's hold on the stick, reaction to the blast, and cushioning of the blow will greatly influence the actual resulting force.

Blast Decay defines the duration of time required for the motion of the simulated mass to decay back to zero (rest) after the initial blast. A high decay parameter will result in one or two oscillations, while a low decay parameter may result in a lengthy reverberation. The user's hold on the stick, reaction to the blast, and cushioning of the blow will greatly influence the actual resulting force.

The mapping of the Dynamic Recoil parameters to the Dynamic Control Law parameters is as follows:

Blast Direction: Direction component of Initial Velocity parameter of the simulated mass M. Can also be mapped to the Initial Position parameter by using the direction to indicate a position in the physical system as referenced to the user object position.

Blast Intensity: Magnitude component of Initial Velocity parameter of the simulated mass M. Can also be mapped to Initial Position by using the Blast Intensity as the magnitude of the displacement of the simulated mass from the user object.

Dynamic Mass: Dynamic Mass

Blast Resonance: Dynamic Stiffness (stiffness can be equal in positive and negative directions)

Blast Decay: Dynamic Damping

Dynamic Impact

An impact sensation is commonly used in gaming applications to simulate the feel of collisions, such as being hit by an incoming object or slamming into an external obstruction. For example, the incoming object might be an asteroid careening into a controlled space ship, a laser blast impinging on a controlled robot-walker, or an opponent's car bumping a controlled car around a tight turn. An external obstruction might be the railing of a race track, the wall of a dungeon, or the back bumper of an opponent's car.

The simplest impact sensation is a jolt imposed in a given direction for a given duration. A more sophisticated impact might be a force profile scripted over a predefined time period. These effects will convey that a collision event has occurred, but the scripted nature of the event will cause the sensation to feel somewhat artificial. Because such effects do not vary based on how the user reacts during the collision, they lack realism. For example, if a user of a first-person action game runs head first into a wall, a canned impact could produce a simple whack to represent the collision. Or, the impact could be a complex scripted profile that simulates the feel of colliding with the wall and bouncing off. But, the collision is pre-planned and just played back over time; how the user is holding the user object during the collision event will not change the feel. For example, if the user is hold the stick rigidly during the collision, the impact will not feel any different than if the user was holding the stick loosely. Or if the user reacts to the collision by quickly pulling back, it will not feel any different than if the user was caught off guard and hit the wall so unexpectedly he could not react at all.

The Dynamic Impact of the present invention defines impact sensations and collision events not as a scripted profile, but as a dynamic simulation that accounts for how the interacting objects respond in real time during the event. Dynamic Impact allows for very complex collision sensations with minimal programming burden when it is implemented using the protocol described herein that is enabled by the dynamic routine. The programmer defines the physical properties of the collision and lets the dynamic routine generate the forces in real time based on how the user reacts during the collision. Experienced players can learn how to minimize the disturbing effect of a collision by reacting appropriately to absorb the energy in their palm, thus enhancing and rewarding skill in game play. The following parameters are used to define the physics of the Dynamic Impact.

Impact Direction defines the direction from which the impact came in the graphical environment.

Impact Intensity defines the overall magnitude of the impact.

Dynamic Mass defines the simulated physical mass of the simulated object controlled by the user. For example, in a driving game it would represent the mass of a controlled car, in a fighting game, the mass of a controlled character. An object defined with large dynamic mass will impact forcefully (with substantial inertia behind it), whereas an object defined with a small mass will not impact with much momentum.

Elasticity defines how the object under control will respond to the collision. An elastic object will compress and absorb much of the impact, creating a much softer feel than an inelastic object which will collide with a crisp crack. The user's hold on the user object, reaction to the collision, and cushioning of the impact will greatly influence the feel.

Collision Absorption defines how quickly the collision disturbance will be absorbed and dissipated after the initial impact. A high absorption parameter will result in the disturbance decaying after one or two oscillations. A low absorption may result in a lengthy reverberation. The user's hold on the user object, reaction to the collision, and cushioning of the impact will greatly influence the feel.

The mapping of the dynamic impact parameters to the Dynamic Control Law parameters is as follows:

Impact_Direction: Direction component of Initial Velocity parameter (or can be mapped to Initial Position as described above)

Impact_Intensity: Magnitude component of Initial Velocity parameter (or can be mapped to Initial Position as described above)

Dynamic Mass: Dynamic Mass

Elasticity: Dynamic Stiffness (stiffness can be made equal in positive and negative directions)

Collision_Absorption: Dynamic Damping

Dynamic Liquid

A liquid sensation is often used in gaming environments where a controlled character is submerged in water, mud, or other viscous mediums. Typically, liquid is simulated as simple damping to create a sensation of "drag"; however, this does not create the dynamic jiggles and oscillations of liquid. As a result, static damping falls short as a realistic liquid simulator. The Dynamic Liquid sensation of the present invention causes forces simulating disturbances, jiggles and undulations in the liquid to create a realistic force sensation The Dynamic Liquid command defines force sensations representing motion within a liquid environment. Dynamic Liquid allows for very complex undulations and jiggle disturbances with minimal programming burden when it is implemented using the protocol described herein that is enabled by the dynamic routine. The programmer defines the physical properties of the liquid medium with parameters and lets the dynamic routine generate the force sensation in real time based on how the user disturbs the simulated liquid. Experienced players can learn how to minimize the disturbing undulations caused when moving through a dynamic liquid by controlling their abrupt motions, thus allowing a greater rate of movement through the liquid. The following three parameters can be used to define the physics of the Dynamic Liquid environment:

Density defines the thickness of the simulated liquid as felt by the user. The greater the density, the larger the disturbance generated when moving through the dynamic liquid. A high density will feel like sloshing around in a thick liquid while a low density might feel like mildly disturbing a thin gas.

Settle defines how quickly the undulations induced in the liquid will settle down after a disturbance. A liquid with a high Settle parameter will oscillate mildly, while a liquid with a low settle parameter will oscillate for a long time after the disturbance. The user's hold on the user object and resistance to the repeated undulations will influence how quickly or slowly the sensation settles.

Viscosity represents the resistance to motion felt by the object or entity under control as it moves through the liquid. High viscosity will feel like mud. Low viscosity will feel like water.

The mapping of the Dynamic Liquid parameters to the Dynamic Control Law parameters is as follows:

Density: Dynamic Mass
Settle: Dynamic Stiffness (stiffness can be made equal in positive and negative directions)
Viscosity: Dynamic Damping Dynamic Inertia Inertia is used to simulate weight of an object in a virtual graphical environment. Simulated weight has many useful applications within gaming environments, but there are few sensations that adequately emulate the feel of a heavy or light joystick, mouse, or steering wheel. For example, it is desirable to make a joystick or wheel feel "heavy" when controlling a big vehicle like a tank or a bomber and feel "light" when controlling a small vehicle like a hang-glider or scooter. Dynamic Inertia is a command that enables accurate weight simulation by using the distributed dynamic processing engine. A programmer simply defines the dynamic parameters shown below in the Dynamic Inertia command:

Inertia defines the weight of the user object felt by the user. In some situations, a negative inertia can be defined so that the user object feels lighter than it actually weighs.

Play defines a gap of free motion between the user object and the simulated mass M referred to in the Dynamic Control Law above. The play parameter causes the user object to feel as if the mass is not attached to the user object very tightly. This works very well for steering wheels and similar user objects, since in real steering systems there is play caused by gear backlash.

The mapping of the dynamic inertia parameters to the Dynamic Control Law parameters is as follows:

Inertia: Dynamic Mass
Play: Length

Dynamic Center Drift

Dynamic Center Drift is a command made possible by the dynamic routine. When using Dynamic Center Drift, the user object is pulled toward an origin by simulated springs of a defined stiffness. This is very similar to static spring return commands used for conditions or other force sensations. In Dynamic Center Drift, however, if the user stays in a given location for a period of time, the origin of the simulated spring slowly drifts to that user object location. In other words, the spring return adjusts to the position of the user object over time. One helpful analogy to visualize this force sensation is that of a spring return where one end of the spring is fixed to the user object and the other end of the spring is fixed to a block or mass that is submerged in mud. The block can slowly drift through the mud, so that if the user stretches the spring by moving the user object and then maintains the user object at a new position for some time, the block will slowly drift toward the user object until the spring is no longer stretched. To define a Dynamic Center Drift, the programmer may define two dynamic parameters:

Stiffness is the strength of the simulated restoring spring, where a stronger spring causes a greater spring force.

Drift Resistance defines how quickly or slowly the origin will drift to follow the current location of the user object.

The mapping of the dynamic center drift parameters to the Dynamic Control Law parameters is as follows:

Stiffness: Dynamic Stiffness (stiffness can be equal in positive and negative directions)
Drift_Resistance: Drag Dynamic Sling The Dynamic Sling simulates the feel of swinging a ball or other mass on the end of a string. As with a real ball, the Dynamic Sling sensation is such that the faster one swings the ball, the stronger the force that is felt. The force pulls radially along the length of the string, simulating the centripetal force pulling on the swinging mass. The string can be rigid like a steel cable or compliant like rubber "bungee" cord.

Figure 11:
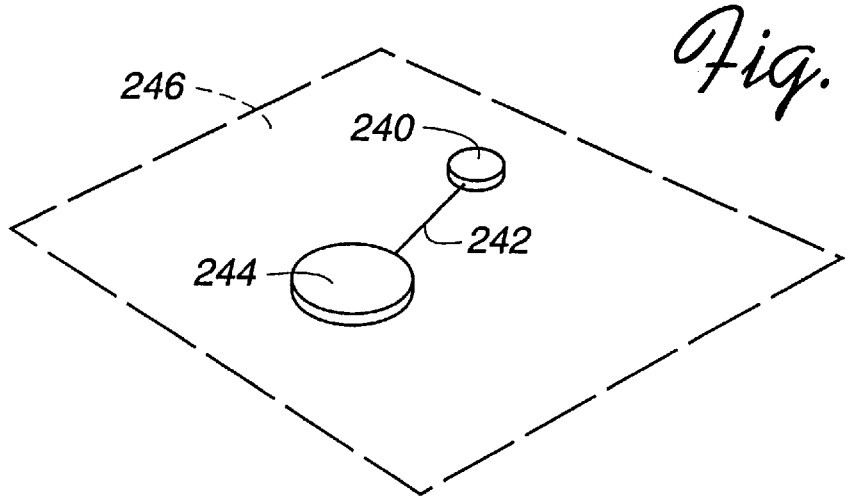
FIG. 11 is diagrammatic representation of a sling dynamic sensation.

One representation of the Dynamic Sling is shown in FIG. 11, where the user object 34, such as a joystick, controls the location of a "bobbin" 240 to which one end of a simulated string 242 (or "flexible member") is attached. The other end of the string 242 is attached to a simulated mass 244. Since a joystick is a two dimensional interface, the motion of the mass and the bobbin is restricted to a plane 246. The joystick 34 controls the motion of the bobbin 240. As the user moves the bobbin in the plane, the mass 244 also move in the plane. If the user moves the bobbin in a circular motion, the mass will swing around as it would in the real world. A certain amount of physical coordination is required to get the mass spinning. This physical coordination is highly dependent upon the feel of the mass pulling on the string. This is a simulated interaction where user motion in real-time and the feel of the mass in real time are both critical to performance. Thus, the algorithm that updates the dynamic simulation of the mass-string interaction must read user position and update the forces felt by the user very quickly, preferably on the order of 1000 times per second, and is preferably performed by the dynamic routine locally on microprocessor 26. The microprocessor can track user motion, update the dynamic simulation of the "mass-on-a-string" based on how the bobbin would move based on joystick motion, and then update forces applied to the user.

There are two aspects of coordinating the Dynamic Sling sensation generated locally by the dynamic routine with software events occurring on the host computer. The first aspect is to customize the feel of the ball-string sensation using parameters. The host computer (and programmer) can update the dynamic routine by sending descriptive parameters that define the physics of the interaction. The parameters described below include the Ball Mass, String Length, String Compliance, and Ball Damping. These four parameters allow for very diverse feel sensations.

Ball Mass defines the simulated physical mass of the ball or other object on the end of the string. The heavier the mass, the stronger the pull for a given spin velocity. Also, the stronger the mass, the more energy is required to be input by the user to start the ball spinning.

String Length defines the simulated distance between the center of the bobbin and the center of the mass. The longer the string, the longer the mass takes to make a complete revolution about the bobbin.

String Compliance defines the compliance of the simulated cable that connects the bobbin and the mass. A compliant string will give the mass a bouncy feel as it spins. A stiff string will give the mass a smooth, rigid feel as it spins.

Ball Damping is best conceptualized as the "wind-resistance" on the ball as it revolves around the bobbin. If the Ball_Damping is low, the ball will have little resistance to motion. Thus, if the user stops moving the bobbin, the ball will continue to spin for a time until its motion dies out. If Ball_Damping is high, the opposite occurs, where the ball will come to rest very quickly after user motion is ceased. This parameter is best understood by contrasting the feel of spinning a ball on the end of a string in air versus in water. In water, the ball would come to rest very quickly once the user motion is stopped, while in air, the ball would make a few revolutions before coming to rest.

The mapping of the dynamic sling parameters to the Dynamic Control Law parameters is as follows:
Ball_Mass: Dynamic Mass
String_Compliance: Dynamic Stiffness
String_Length: Length
Ball_Damping: Drag The second aspect of coordinating the Dynamic Sling sensation generated locally by the dynamic routine with software events happening on the host computer is to use interim reporting described previously. Interim reporting allows the local processor 26 to provide the host computer with intermittent updates about the physical simulation. In this case, the processor reports the location of the simulated mass with respect to the user object location.

The locations of the simulated mass are reported in addition to reporting the locations of user object to allow accurate coordination and display of objects moving in the sling simulation (in this case, the simulated mass M is displayed by the host). For example, in a first person fighting game, the controlled character wields a mace, flail, or similar weapon including a heavy metal ball with spikes that swings on the end of a chain held by the character. A graphical display animation of the swinging mace is implemented by the host computer. The force feedback interface device 14 is sent the dynamic host command with appropriate Dynamic Sling parameters. To coordinate the animation displayed by the host computer with the feel performed by the interface device, interim reporting is implemented, where the host computer requests the interface device to report the location of the simulated mass with respect to the joystick at time steps during the interaction (where the time steps can be specified in a host command if desired). The host computer uses the reported data to display the mass in a location that corresponds with the feel.

Dynamic Paddle

Dynamic Paddle provides the sensation simulating a feel of hitting a ball or other projectile with a paddle or other compliant object like a rubber-band, force-field, pillow, etc. As with a real ball-paddle interaction, the Dynamic Paddle sensation is such that the faster the ball hits the paddle, the harder the impact. Also, the user reactions during the ball-paddle interaction greatly changes the feel. For example, if the user tries to cushion the blow and slow-down the ball, the feel is very different than if the user tries to resist the blow and accelerate the ball.

Figure 12A:
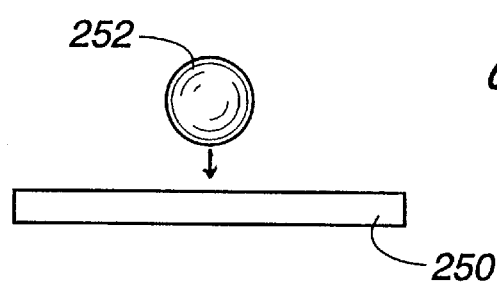
FIGS. 12a–b are diagrammatic representations of a paddle dynamic sensation.
Figure 12B:
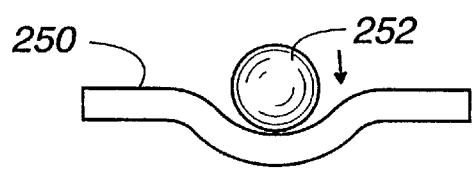

As shown in FIG. 12a, one way to visualize the Dynamic Paddle is to think of the user object, such as a joystick, controlling the location of a paddle 250 which has just been hit by a ball 252. The paddle preferably is compliant and "bends" as the ball impacts the paddle, as shown in FIG. 12b. The weight of the ball, the velocity of the ball, the direction of motion of the ball, and the stiffness of the paddle, all effect the feel of the interaction. All of these physical factors can be defined with basic parameters. The reactions of the user during the interaction also effect the feel and the way the ball bounces off the paddle; for example, a cushioned blow will eject a slow moving ball while a stiff blow will eject a fast moving ball. In addition, since the user reactions during the interaction effect the outcome of the event, interim reporting is preferably used. This interim reporting serves two functions: a) to provide a real-time update of ball location with respect to the paddle (user object) during the interaction and b) to report the final velocity of the ball when it leaves the paddle so that the host can update the software with an appropriate final state.

In another example, simulated asteroids (balls) impact a force field (paddle) of a user-controlled space ship. The asteroids compress the force field and bounce off. In addition, a skilled player can deflect the asteroids towards their opponents if they cushion the blow correctly. In addition, an animation of the graphical impact of the asteroid hitting the force field is implemented by the host, and the feel of the impact is defined by basic parameters such as Ball_Mass, Initial Velocity, and Paddle_Compliance. To coordinate the animation with the force sensations output by the interface device, the dynamic routine is sent a host command at the moment that the asteroid hits the space ship, causing the dynamic routine to produce a dynamic paddle sensation with the provided parameters. The parameters include the initial velocity of the asteroid, so that the sensation will correlates with the perceived speed of the asteroid on the visual display device. The dynamic routine computes the high-fidelity dynamic simulation using the simulated model of the Dynamic Control Law and using interim reporting to report the position of the asteroid with respect to the user object to the host computer. The reported position values allow the host computer to update the animation to show how deeply the force field is stretched during the collision. The user reacts to the impact and deflects the asteroid using a subtle wrist snap so that it should continue forth and pummel an opponent ship. Using interim reporting, the final velocity of the asteroid as it loses contact with the controlled force field is reported to the host computer in addition to position of the asteroid so the game can maintain coordination and have the asteroid fly off in the right direction at a correct speed on the visual display.

The preferred parameters of the Dynamic Paddle sensation are as follows:

Ball Mass defines the simulated physical mass of the ball impacting the paddle. The heavier the mass, the stronger the impact.

Initial Velocity defines the physical velocity of the ball at the moment of impact. This initial velocity has both a magnitude and direction, both of which affect the resulting feel.

Paddle Compliance defines the springiness of the paddle surface. A compliant paddle will stretch and snap back with a large displacement as if it were a loose rubber band. A stiff paddle will not stretch appreciably, as if it were the tight strings of a tennis racquet.

Paddle Damping defines how much momentum is lost within the paddle as the ball bounces off. A paddle with low Paddle_Damping will repel a projectile with the same velocity as the projectile had upon impact. A paddle with high Paddle_Damping will absorb much of the momentum during the interaction so that the projectile bounces off with a much lower speed than when it impacted.

Gravity defines a physical bias upon the projectile that represents the acceleration of gravity. This parameter has both a magnitude and a direction. It is useful for gaming scenarios where the mass is a ball that is being bounced in a gravitational field (a ball bouncing into the air off a tennis racquet) but is not useful for scenarios where the ball is not effected by a directional gravitational pull (like the asteroid bouncing off a space ship).

The mapping of the Dynamic Paddle parameters to the Dynamic Control Law parameters is as follows:

Ball_Mass: Dynamic Mass

Initial_Velocity: Initial Velocity (both magnitude and direction components)

Paddle_Compliance: Dynamic Stiffness (stiffness is usually equal in positive and negative directions)

Paddle_Damping: Dynamic Damping

Gravity: Gravity (both magnitude and direction components).

Figure 13:
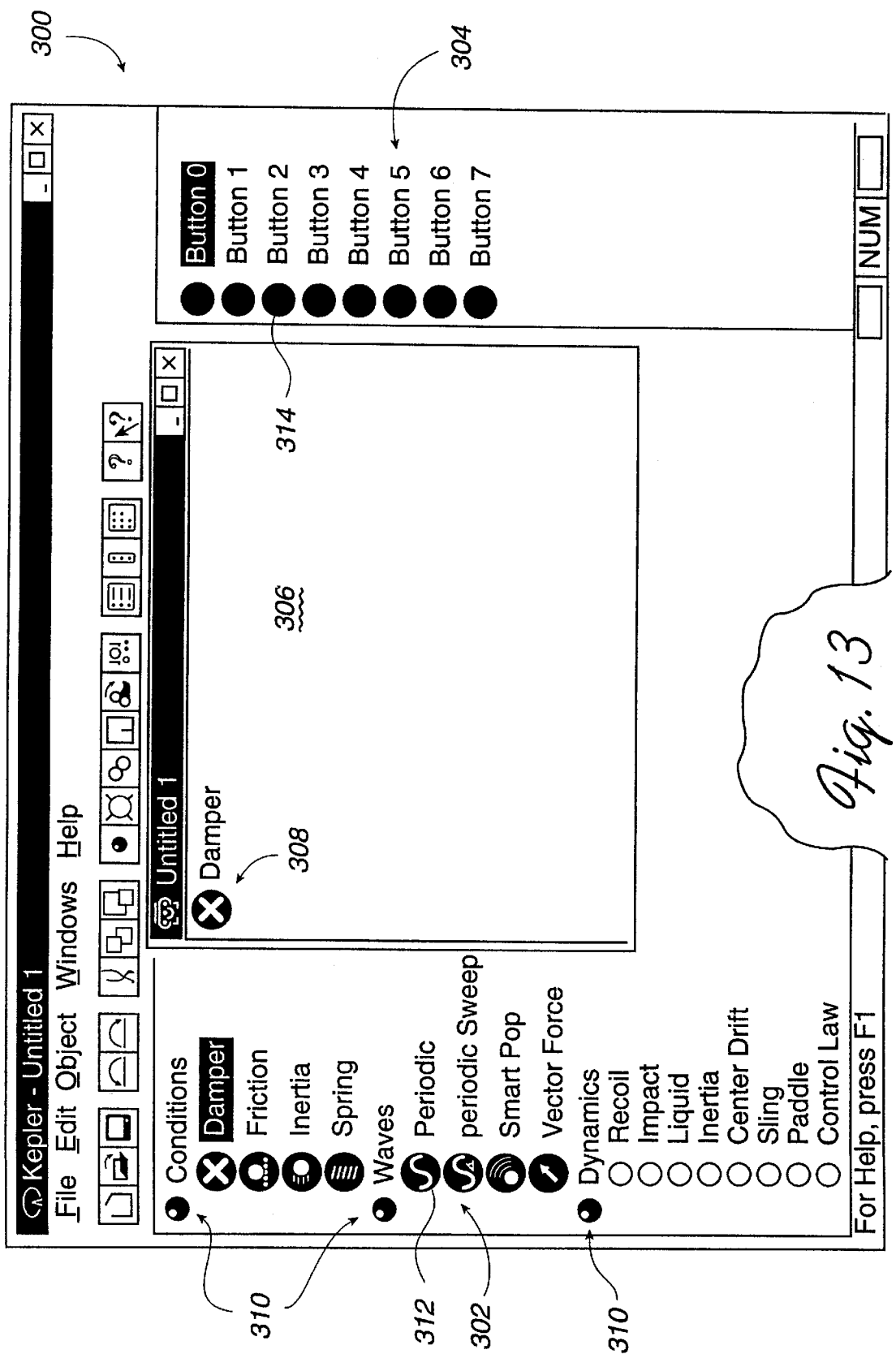
FIG. 13 is a diagram of a displayed interface of the present invention for designing force sensations.

FIG. 13 is a display device 20 displaying an interactive graphical toolset interface 300 of the present invention that enables developers and programmers of force feedback ("users" of the interface) to design and implement force sensations rapidly and efficiently. The graphical environment allows conditions, effects ("waves"), and dynamics to be defined through intuitive graphical metaphors that convey the physical meaning of each parameter involved. As the parameters are manipulated, sensations can be felt in real-time, allowing for an iterative design process that fine-tunes the feel to the designer's exact need. Once the appropriate sensation is achieved, the interface can save the parameters as a resource and automatically generate optimized code in a desired format that can be used directly within an application program. Thus, interface 300 handles most of the force feedback development process from force sensation design to coding. With these tools, force feedback programming becomes a fast and simple process.

The challenge of programming for force feedback is not the act of coding. Force models to provide force sensations are available, and, once the desired force sensation is known and characterized, it is straightforward to implement the force sensation using software instructions. However, the act of designing force sensations to provide a desired feel that appropriately match gaming or other application events is not so straightforward. Designing force sensations and a particular feel requires a creative and interactive process where parameters are defined, their effect experienced, and the parameters are modified until the sensations are at the desired characterization. For example, when designing conditions, this interactive process might involve setting the stiffness of springs, sizing the deadband, manipulating the offset, and tuning the saturation values. When designing effects, this might involve selecting a wave source (sine, square, triangle, etc.), setting the magnitude, frequency, and duration of the signal, and then tuning the envelope parameters. For a dynamic sensation, this might involve setting the dynamic mass, and then tuning resonance and decay parameters. With so many parameters to choose from, each applicable to a different type of force sensation, there needs to be a fast, simple, and interactive means for sensation design. To solve this need, the graphical interface 300 of the present invention allows a user to rapidly set physical parameters and feel sensations, after which the interface automatically generates the appropriate code for use in a host computer application program.

Interface 300 enables interactive real-time sensation design of conditions, effects, and dynamics, where parameters can be defined and experienced through a rapid iterative process. Thus, it is preferred that a force feedback interface device 14 be connected to the computer implementing interface 300 and be operative to output commanded force sensations. Intuitive graphical metaphors that enhance a programmer's understanding of the physical parameters related to each sensation type are provided in interface 300, thereby speeding the iterative design process. File-management tools are also preferably provided in interface 300 so that designed force sensations can be saved, copied, modified, and combined, thereby allowing a user to establish a library of force sensations. Once sensations are defined, the interface 300 preferably stores the parameters as "resources" which can be used by an application program. For example, by linking a force sensation resource into an application program, the resources can be converted into optimized Direct-X code for use in an application in the Windows environment. Other code formats or languages can be provided in other embodiments. Interface 300 can be implemented by program instructions or code stored on a computer readable medium, where the computer readable medium can be either a portable or immobile item and may be semiconductor or other memory of the executing computer (such as computer 12), magnetic hard disk or tape, portable disk, optical media such as CD-ROM, PCMCIA card, or other medium.

As shown in FIG. 13, the interface 300 has three primary work areas: the sensation pallet 302, the button trigger pallet 304, and the design space 306. Force sensations are created in the design space 306 and can be saved and loaded into that space using standard file handling features.

To create a new force sensation, a sensation type is chosen from the sensation pallet 302. Pallet 302 is shown in an expandable tree format. The root of the tree includes the three classes 310 of force feedback sensations described herein, conditions, waves (effects), and dynamics. Preferably, users can also define their own headings; for example, a "Favorites" group can be added, where force sensations with desirable previously-designed parameters are stored.

In interface 300, the conditions, waves, and dynamics classes are shown in expanded view. These classes may also be "compressed" so as to only display the class heading, if desired. When a class is displayed in expanded view, the interface 300 displays a listing of all the sensation types that are supported by the hardware connected to the host computer 12 for that class. For example, when programming for more recent or expensive hardware supporting a large number of force sensation types, a list including many or all available sensation types is displayed. When programming for older or less expensive interface device hardware that may not implement all the sensations, some sensation types can be omitted or unavailable to be selected in the expanded view. Preferably, interface 300 can determine exactly what force sensations are supported by a given interface device 14 connected to the host computer by using an effect enumeration process, i.e., the host computer can request information from the interface device, such as a version number, date of manufacture, list of implemented features, etc.

Once a sensation type is chosen from the sensation pallet 302, the sensation type is added to the design space 306. For example, in FIG. 13, an icon 308 for the selected force sensation "Damper" is displayed within the design space 306 window. Icon 308 can now be selected/opened by the user in order to set the parameters for the given sensation type using graphical development tools (described below). Multiple icons can similarly be dragged to the design space to create a more complex force sensation. Once the parameters are specified for the given sensation, the sensation can be saved as a resource file. Using this process, a user can create a diverse library of feel sensations as resource files.

Also, predefined libraries of sample resources from third party sources might also be available.

Options displayed in the trigger button pallet 304 can also be selected by the user. Trigger pallet 304 is used for testing force sensations that are going to be defined as button reflexes. For example, a force sensation might be designed as a combination of a square wave and a sine wave that triggers when Button #2 of the interface device is pressed. The square wave would be created by choosing the periodic type 312 from the sensation pallet 302 and defining parameters appropriate for the square wave. A sine wave would then be created by choosing another periodic type 312 from the sensation pallet 302 and defining the parameters appropriate for the sine wave. At this point, two periodic icons 308 would be displayed in the design space window 306. To test the trigger, the user can just drag and drop these icons 308 into the Button 2 icon 314. Button 2 on the interface device 14 has thus been designed to trigger the reflex sensation when pressed. This process is fast, simple, and versatile. When the user achieves a sensation exactly as desired, the sensation can be saved as a resource file and optimized software code for use in the application program is generated. The Button 2 selection might be provided in other ways in different embodiments. For example, the user might select or highlight the designed force icons in design space 306 and then select the Button 2 icon in pallet 304 to indicate that the highlighted forces will be triggered by Button 2.

Figure 14:
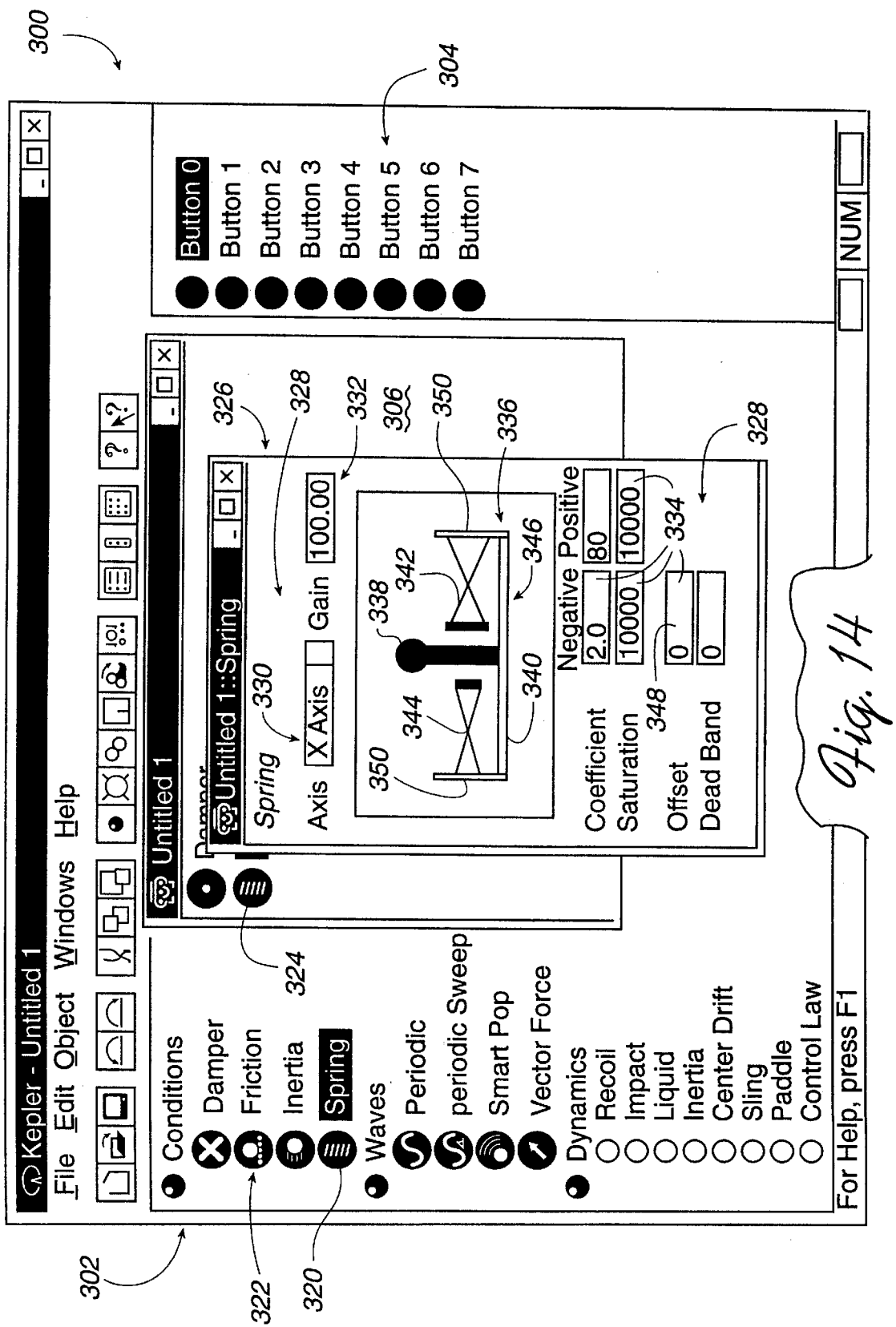
FIG. 14 is a diagram of the interface of FIG. 13 in which a design window for a spring condition is displayed.

FIG. 14 illustrates interface 300 where a force sensation is characterized in the design space 306. When an icon 308 in design space 306 is selected by the user, the icon 308 expands into a force sensation window and graphical environment for setting and testing the physical parameters associated with the selected sensation. For example, in FIG. 14, a spring sensation type 320 has been selected from the condition list 322 and provided as icon 324 in the design space 306. A spring window 326 is displayed in design space 306 when icon 324 is selected. Within spring window 326 are fields 328 characterizing the force, including the axis 330 (and/or direction, degree of freedom, etc.) in which the force is to be applied, the gain 332 (or magnitude) of the force, and the parameters 334 associated with the force sensation. For example, for the spring sensation, the positive stiffness ("coefficient"), negative stiffness ("coefficient"), positive saturation, negative saturation, offset, and deadband of the spring sensation are displayed as parameters. The user can input desired data into the fields 328 to characterize the force. For example, the user has specified that the force is to be applied along the x-axis (in both directions, since no single direction is specified, has specified a gain of 100, and has specified saturation values of 10,000 in positive and negative directions. The user can also preferably specify all or some of the parameters in graphical fashion by adjusting the size or shape of the envelope, the height or frequency of the waveform, the width of the deadband or springs, the location of a wall on an axis, etc. by using a cursor or other controlled graphical object.

As the user inputs values into fields 328, the resulting additions and changes to the force sensation are displayed in an intuitive graphical format in the force sensation window. For example, in the spring sensation window 326, graphical representation 336 is displayed. Representation 336 includes an image 338 of the user object 34 (shown as a joystick, but which also can be shown as other types of user objects), an image 340 of ground, an image 342 of a spring on the right of the joystick 34, and an image 344 of a spring on the left of the joystick 34.

Representation 336 models a single axis or degree of freedom of the interface device.

Representation 336 represents a physical, graphical model with which the user can visually understand the functioning of the force sensation. The user object image 338 is displayed preferably having a shape similar to the actual user object of the desired interface device. Along the displayed axis, in both directions, there are spring images 342 and 344 as defined by a positive stiffness parameter (k) and a negative stiffness parameter (k). Graphically, the large stiffness of the spring to the right (coefficient of 80) is represented as a larger spring image 342. The origin of the spring condition is shown at a center position 346, since the offset parameter 348 is zero. If the offset has a positive or negative magnitude, the origin would be displayed accordingly toward the left or right. The deadband region is shown graphically as the gap between the user object image 338 and the spring images 342 and 344.

In the preferred embodiment, the graphical representation further helps the user visualize the designed force sensation by being updated in real time in accordance with the movement of the user object 34 of the connected interface device 14. User object image 338 will move in a direction corresponding to the movement of user object 34 as caused by the user. The user object is free to be moved in either the positive or negative direction along the given axis and encounter either a positive or negative stiffness from the spring sensation. Thus, if the user object is freely moved to the left from origin 346, the joystick image 338 is moved left in the deadband region, and when the user object 34 encounters the spring resistance, the joystick image 338 is displayed contacting the spring image 344. If there is no deadband defined, the spring images 342 and 344 are displayed as contacting the joystick image 338 at the center position. The edge stop images 350 define the limits to the degree of freedom; for example, when the user object 34 is moved to a physical limit of the interface device along an axis, the joystick image 338 is displayed as contacting an appropriate edge stop image 350.

Figure 15A:
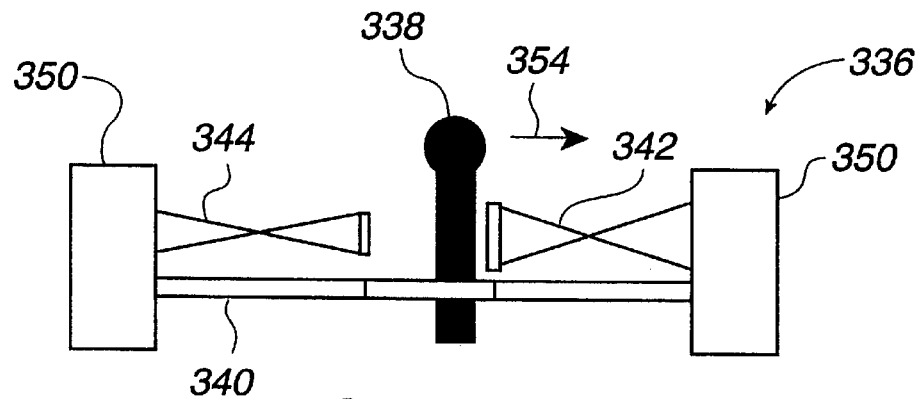
FIGS. 15a–c are diagrams of displayed graphical representations of a spring condition.
Figure 15B:
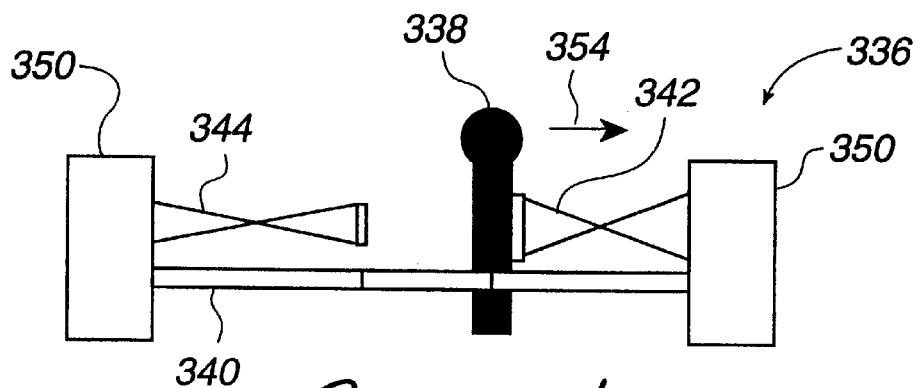
Figure 15C:
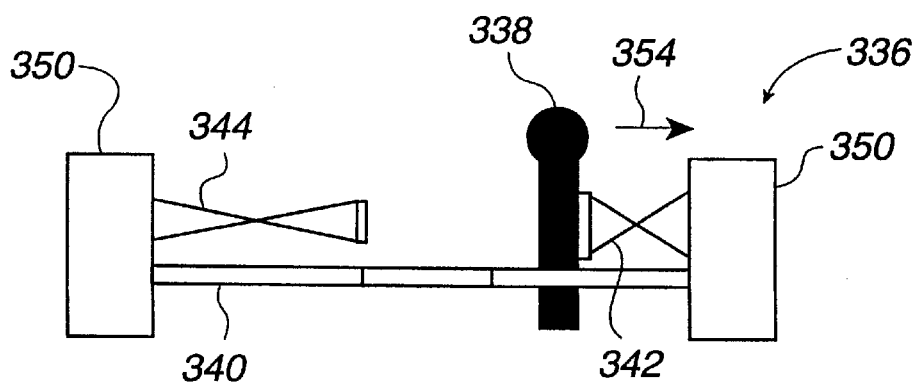

FIGS. 15a–15c illustrate graphical representation 336 as the user object 34 is moved by the user. In FIG. 15a, the user moves the user object 34 and image 338 in a positive direction along an axis as shown by arrow 354. No force resistance is felt by the user, since the user object is in the deadband region. This is represented by displaying joystick image 338 having no contact with other objects. In FIG. 15b, the user object 34 encounters spring stiffness in the positive direction and begins to compress the spring. As shown by the graphical representation 336, the joystick image 338 has contacted right spring image 342 and the spring image 342 is shown slightly compressed. In FIG. 15c, the user object continues to move against the spring force, as accordingly displayed as spring 342 compression in representation 336. Once the positive spring stiffness is encountered, the resistance force increases linearly with compression of the spring (as is true of a real spring). The amount of compression felt by the user is correlated with the amount of compression shown by spring image 342. If the programmer has defined a saturation value for force opposing movement in the positive direction, the force output would cease increasing with compression once the saturation limit in the positive direction was exceeded. The saturation can also be shown graphically, for example by displaying the applicable spring image in a different color (such as red), or by displaying a message or indicator on the screen.

Referring to FIG. 14, once the user has tested the input parameters and settings, he or she may change any of the existing information or add new information by inputting data into fields 328. Any such changes will instantly be displayed in window 326. For example, if the user changes the coefficient (stiffness) of the spring on the right, the spring image 342 will immediately be changed in size to correlate with the new value. The user thus gains an intuitive sense of how the sensation will feel by simply viewing the representation 336. The user can then determine how the sensation will feel with more accuracy (fine tuning) by moving the user object and feeling the sensation. Thus, the graphical representation 336 as displayed clearly demonstrates to the user the various effects of parameters on the force sensation and additionally allows the user to experience the forces coordinated with the graphical representation.

Figure 16:
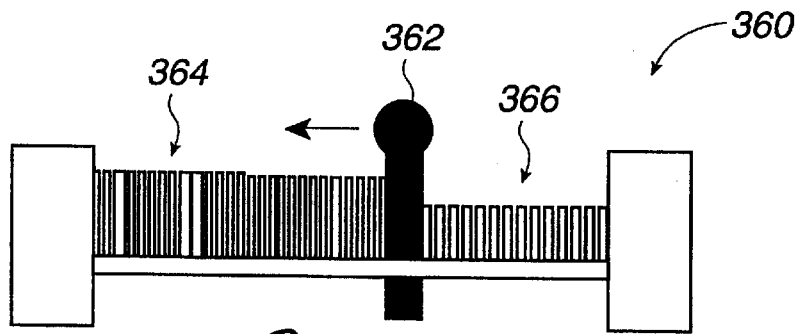
FIG. 16 is a diagram of a displayed graphical representation of a texture condition.

FIG. 16 illustrates another graphical representation 360 that can be displayed in interface 300 for a spatial texture condition. Joystick image 362 is moved in coordination with movement of the user object 34, as described above. A spatial texture is graphically designated in the displayed axis by left grating 364 and right grating 366, which represent "bumps" in the texture. Left grating 364 has a different size of "bump" and a different spacing between bumps than right grating 366. The appropriate texture is felt by the user on user object 34 and visualized on representation 360 as the user object is moved through the textured region. The user preferably can specify the space between bumps, the size of the bumps, the magnitude of the bumps (shown by the height of the grating in representation 360), and the overall size of a textured region in an axis. Each axis can preferably be separately characterized with textures.

Figure 17A:
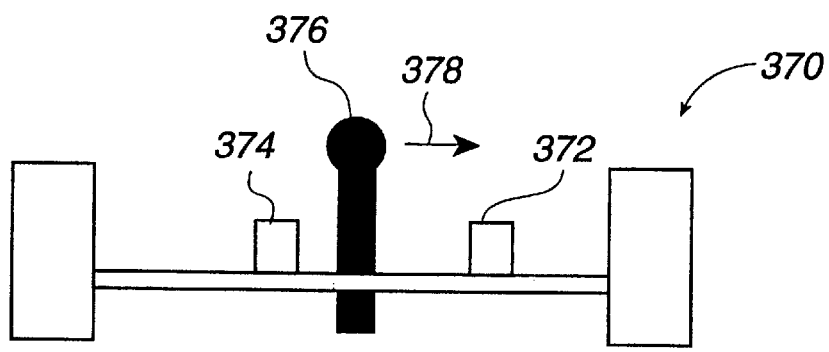
FIGS. 17a and 17b are displayed graphical representations of a wall condition.
Figure 17B:
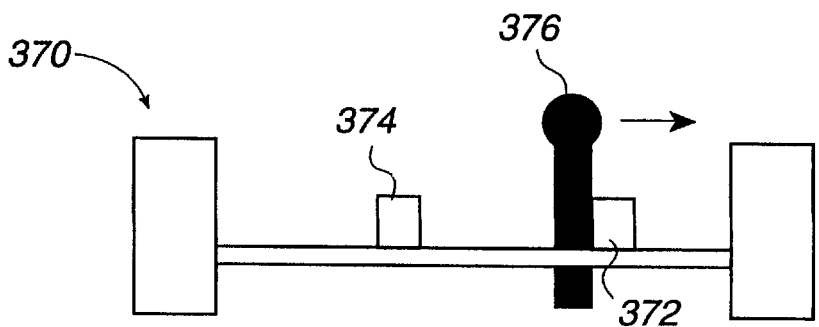

FIG. 17a illustrates a graphical representation 370 that can be displayed in interface 300 for a wall condition. Hard-stop images 372 and/or 374 can be provided in the path of travel of the joystick image 376. As shown in FIG. 17b, when the user object is moved to encounter the wall force, the joystick image 376 is correspondingly moved as shown by arrow 378 against the stop image 372. The user can specify the location of the wall, the hardness of the wall, and other parameters as discussed above for a wall condition. For example, if the user specifies the wall as having a hard like metal material, the image of the joystick 376 will not tend to bend or compress the stop image 372. However, if the wall is specified as a flexible, rubber-like material, the joystick 376 can be displayed moving into the stop image 372 or the stop image can be displayed as "compressing" or shrinking as the wall "flexes" in response to the user object moving into it.

Other condition force sensations may also be similarly graphically represented in design space 306. For example, a damping condition can be displayed similarly to the spring condition, where a schematic representation of a damper is displayed in each direction on an axis. An inertia condition can be represented using a graphical image of a mass on top of or connected to the joystick image 338, where the size of the image indicates the size of the mass. A friction condition can be represented by a texture having bumps or the like, or by a region having a specific color or shade.

In other embodiments, a 2 dimensional force sensation (i.e. two degrees of freedom) can be displayed in the window 326 by showing an overhead representation of the user object. For example, a circular user object image can be displayed in the middle of two sets of spring images in a cross formation, each set of springs for a different degree of freedom.

Figure 18:
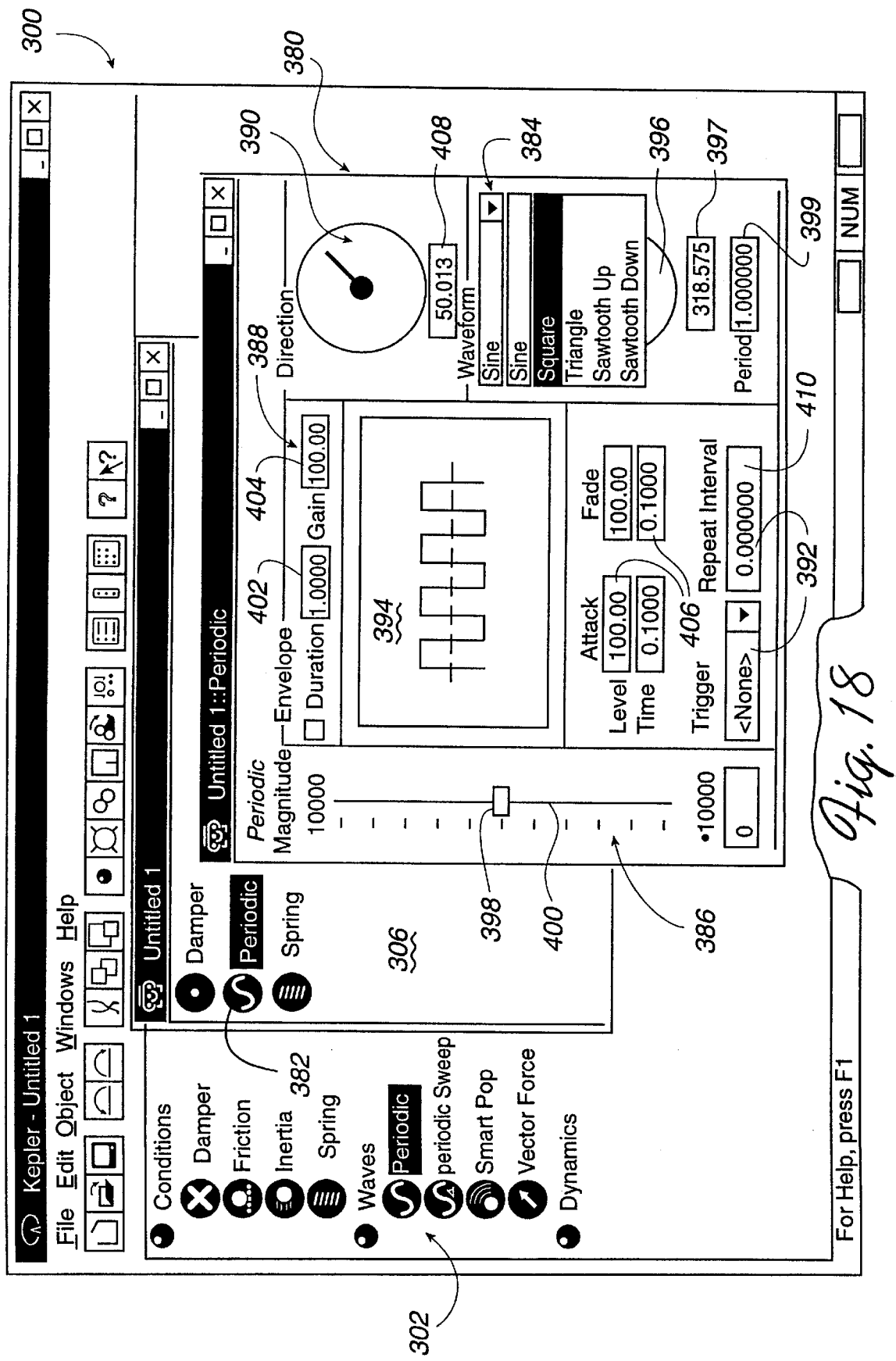
FIG. 18 is a diagram of the interface of FIG. 13 in which a design window for a periodic effect is displayed.

FIG. 18 illustrates interface 300 with a graphical representation for a periodic wave (effect) sensation. Periodic window 380 is displayed in response to the user selecting (e.g., double clicking on) periodic icon 382 that has been dragged into design space 306. The periodic window 380 includes a waveform source field 384, magnitude scale 386, envelope parameters 388, direction dial 390, trigger parameters 392, and a graphical representation 392. Waveform source field 384 allows a user to select from multiple available types of signal wave sources for the effect. In the case of FIG. 18, the user has selected a square wave source. Graphical representation 394 is displayed having a shape based on the wave source chosen. Thus, a square wave is graphically displayed in the example of FIG. 18. The direction of the waveform may also be selected using dial 396 (which is partially obscured by the wave source drop-down menu) and field 397. A period 399 may also be input to specify the frequency of the waveform.

The magnitude scale 386 can be adjusted by the user to select a magnitude of the wave shown by graphical representation 394. In the preferred embodiment, the scale is a slider control knob 398 that can be moved by the user along the scale 400, where the scale 400 is preferably arranged in a vertical orientation corresponding to the magnitude scale of graphical representation 394 to permit greater ease of visualization on the part of the user. In other embodiments, other magnitude selection fields or objects may be provided.

Envelope parameters 388 allow the user to shape the waveform into a desired effect. For example, parameters 388 preferably include a duration field 402, a gain field 404 (where "gain" can be used as a global scaling factor or multiplier for force magnitudes output by the interface device 14), and attack and fade parameters 406 to permit the specifying of impulse magnitude and fade rate. Direction dial 390 is a graphical object allowing a user to specify the direction of the effect in two dimensions. The user may drag or otherwise specify the angle of the pointer, which is also shown in direction field 408 (dial 396 is preferably similar). Trigger parameters 392 allow a user to assign trigger button (s) to the designed effect. The repeat interval field 410 allows a user to specify the amount of time before the effect is repeated if the designated button is held down. These parameters and characteristics can be entered as numbers in the displayed input fields or prompts, or can be input by dragging the graphical representation 394 of the waveform with a cursor to the desired shape or level.

The parameters, when specified, cause the graphical representation 394 to change according to the parameters. Thus, if the user specifies a particular envelope, that envelope is immediately displayed in the window 380. The user can thus quickly visually determine how specified parameters exactly affect the periodic waveform. The user can also activate the waveform sensation and grasp the user object to experience the actual force sensation. Preferably, the graphical representation 380 is animated or a pointer is moved in coordination with the output of the force sensation on the user object. For example, if an impulse and fade is specified, the wave is animated so that the impulse portion of the waveform is displayed when the impulse force is output on the user object, and the fade is displayed when the output force fades down to a steady state level. Alternatively, the entire waveform can be displayed, and a pointer or other marker can designate which portion of the waveform is currently being output as a force on the user object. This feature enables the user to realize how different portions of the wave affect the feel sensation on the user object.

FIG. 19 illustrates interface 300 displaying a graphical representation of an advanced periodic sweep sensation. This type of waveform may include additional variables and features over the standard waveform effect described with reference to FIG. 18. A periodic sweep sensation is similar to a standard periodic waveform or vibration, but is different in that the direction of the force sweeps between a start and end orientation or direction. A start dial 412 and an end dial 414 are used by the user to define the starting and ending directions for the periodic sweep. In example of FIG. 19, the user has chosen a sine wave as the signal source in field 384. The user also has assigned values to the magnitude, period, and of the signal, similar to the waveform of FIG. 18. The user has also activated the envelope feature and has created an impulse wave shape using attack and fade parameters 406. In addition, the user can assign a phase using a phase pointer 416 and phase field 418, which indicate the phase angle of the waveform. These parameters and characteristics can be entered as numbers in an input field or prompt, or can be input by dragging the graphical outline of the waveform with a cursor to the desired shape or level. When the user wishes to test the force sensation, the user can feel the direction of the force sweep through the directions as specified in the dials 412 and 414 and can thus easily determine the correlation of the dials and the desired feel sensation.

Other waves that can be designed and tested in the interface 300 include a "smart pop" and a vector force. For example, a Vector force can be designed using a window similar to window 380, where the direction of the force is selected with dial 390. An envelope could also be specified for the vector force, if desired, using window 390 and displayed therein.

Dynamic force sensations, when selected in design space 306, are similarly displayed in a sensation window and provide parameter fields into which the user may enter parameter data. A visual representation can be displayed as the simulated physical system described above and shown in FIG. 10. For example, the Dynamic Control Law sensation has parameters that directly affect the components of the displayed physical system and can be readily viewed and tested by the user. For the other dynamic sensations, the user can be shown the mapping of the parameters of the selected dynamic sensation to the dynamic control law parameters so the user can view how the parameters effect the simulated physical system. In other embodiments, a more appropriate representation might be displayed instead of or in addition to the physical system of FIG. 10. For example, for the sling and paddle sensations, a representation similar to FIGS. 11 and 12 can be displayed. For Dynamic Liquid, the user object can be displayed in the middle of animated liquid which undulates in conjunction with the movement of simulated mass M of FIG. 10. For Dynamic Recoil, a picture of a gun or weapon can move in conjunction with the blast and reverberation of the sensation. Other animations and representations can be provided as desired.

Once a force sensation has been designed using the graphical tools as described above, the definition can be saved as a resource of parameters. By accessing the interface resource from an application program, the resource is converted automatically from a parameter set to code in the desired language or format, e.g., Direct-X by Microsoft® Corporation for use in the Windows™ operating system. For example, the force feedback resource can be provided as or in a DLL (Dynamic Linked Library) that is linked to an application program. In one embodiment, the DLL can provide the application program with effects defined as completed Direct_X Structs (DI_Struct), where the application programmer can then create effects by using the CreateEffect call within Direct-X (or equivalent calls in other languages/formats). Or, the DLL can perform the entire process and create the effect for the application program, providing the programmer with a pointer to the sensation. One advantage of using the first option of having the programmer call CreateEffect is that it gives the programmer the opportunity to access the parameters before creating the effect so that the parameters can be modified, if desired.

While this invention has been described in terms of several preferred embodiments, it is contemplated that alterations, permutations and equivalents thereof will become apparent to those skilled in the art upon a reading of the specification and study of the drawings. For example, many different parameters can be associated with dynamic sensations, conditions, and effects to allow ease of specifying a particular force sensation. In addition, many types of different visual metaphors can be displayed in the interface tool of the present invention to allow a programmer to easily visualize changes to a force sensation and to enhance the characterization of the force sensation. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A computer readable medium including program instructions for implementing a force sensation design interface, said program instructions performing steps of:
   receiving input from a user on a host computer, said input selecting a type of force sensation to be commanded by a host computer and output by a force feedback interface device, said force feedback interface device including a user manipulatable object graspable by a user and moveable in a degree of freedom;
   receiving input from a user defining physical characteristics of a particular force sensation of said selected type; and
   displaying a graphical representation of said particular force sensation as characterized by said user, wherein said graphical representation provides said user with a visual demonstration of a feel of said characterized force sensation.

2. A computer readable medium as recited in claim 1 further comprising program instructions for receiving additional changes to said characterized force sensation from said user and displaying said additional changes in said graphical representation.

3. A computer readable medium as recited in claim 1 further comprising program instructions for commanding said characterized force sensation on said force feedback interface device coupled to said host computer such that actuators of said force feedback interface device output said force sensation on said user object.

4. A computer readable medium as recited in claim 3 wherein said force sensation has a duration, and wherein said graphical representation is updated in accordance with a current force output on said user object during said force sensation.

5. A computer readable medium as recited in claim 1 wherein a plurality of force sensations are selectable by said user, and wherein said selectable types of force sensations include conditions, effects, and dynamics.

6. A computer readable medium as recited in claim 1 wherein said selected type of force sensation is a spring condition, and wherein said graphical representation is a representation of said user manipulatable object and an image of a spring.

7. A computer readable medium as recited in claim 1 wherein said selected type of force sensation is a periodic force sensation, and wherein said graphical representation is an image of a periodic waveform.

8. A computer readable medium as recited in claim 7 wherein said characterization includes specifying an envelope for said periodic waveform, said envelope being displayed in said graphical representation.

9. A method for providing a force sensation design interface implemented by a computer, said method comprising:

displaying a design interface on a display device of a computer;

receiving input in said design interface from a user, said input selecting a type of force sensation to be commanded by a host computer and output by a force feedback interface device, said force feedback interface device including a user manipulatable object graspable by a user and moveable in a degree of freedom;

receiving input from a user to specify parameters which define characteristics of a particular force sensation of said selected type; and displaying a graphical representation of said characterized force sensation in said design interface, wherein said graphical representation includes visual representations of said parameters such that said user can view an effect of said parameters on said force sensation.

10. A method as recited in claim 9 further comprising:

commanding said characterized force sensation on said force feedback interface device coupled to said host computer such that actuators of said force feedback interface device output said force sensation on said user object; and updating said graphical representation in accordance with said force sensation being output on said user object.

11. A method as recited in claim 10 wherein said graphical representation includes portions that can be graphically manipulated by said user using a displayed cursor when performing said updating of said graphical representation.

12. A method as recited in claim 9 wherein said graphical representation includes a representation of a spring, and wherein said particular force sensation is a spring force sensation.

13. A method as recited in claim 12 wherein said user can modify a size of saturation of said spring sensation and a stiffness of said spring sensation.

14. A method as recited in claim 12 wherein said graphical representation includes an animated graphical representation of a spring that is compressible through user manipulation of said user manipulatable object.

15. A method as recited in claim 9 wherein said graphical representation includes a force versus time graph, and wherein said particular force sensation is a periodic force sensation.

16. A method as recited in claim 9 wherein said user can modify a size of a deadband of said force sensation.

17. A method as recited in claim 16 wherein said deadband is portrayed in said graphical representation as a space between two spring images.

18. A method as recited in claim 9 further comprising receiving additional input from said user to modify at least one of said parameters defining characteristics of said force sensation.

19. A method as recited in claim 9 wherein said graphical representation can be associated with a specific axis of said force feedback interface device, said force feedback interface device having multiple axes.

20. A method as recited in claim 9 wherein said graphical representation can be associated with said force sensation that is implemented on multiple axes of said force feedback interface device simultaneously.

21. A method as recited in claim 20 wherein said axes include an x-axis and a y-axis.

22. A method as recited in claim 9 wherein said force sensation is output in a particular angle in a two axis plane, said angle being selectable by said user.

23. A method as recited in claim 9 further comprising receiving inputs from said user to graphically assign said selected force sensation to a button on said force feedback interface device.

24. A method as recited in claim 23 wherein said graphically assigning said selected force sensation to a button includes allowing said user to drag an icon representing said selected force sensation and drop said icon at an icon or area that represents a particular button on said force feedback interface device.

25. A method as recited in claim 9 further comprising saving said characterized force sensation as resource file of parameters which can be accessed by other application programs having force feedback functionality.

26. A method for graphically allowing a user to design the feel of a simulated vibration sensation to be output by a force feedback interface device coupled to a host computer, said method comprising:

displaying a graphical profile using said host computer, said graphical profile being representative of the force versus time characteristics of said simulated vibration sensation;

providing points on said graphical profile that can be manipulated by the user to modify the feel of said simulated vibration sensation; and commanding said simulated vibration sensation to said force feedback interface device coupled to said host computer such that actuators of said force feedback interface device modify a force output by said interface device as a function of time in accordance with requirements of said simulated vibration sensation.

27. A method as recited in claim 26 wherein said graphical profile includes a waveform fitted within an envelope.

28. A method as recited in claim 27 wherein at least one of said points allows said user to modify a magnitude of said waveform.

29. A method as recited in claim 26 wherein at least one of said points allows said user to modify attack characteristics of said waveform.

30. A method as recited in claim 26 wherein at least one of said points allows said user to modify fade parameters of said waveform.

31. A method as recited in claim 26 wherein said graphical profile is associated with a specific direction of a multi axis force feedback device.

32. A method as recited in claim 26 wherein said graphical profile can be displayed at a given angle in a two axis plane, said angle being selectable by said user.

33. A method as recited in claim 26 wherein a basic shape of said waveform can be selected by said user from a set that includes a sine wave and a square wave.

34. A method as recited in claim 26 further comprising assigning said modified vibration sensation to one of a plurality of buttons of said force feedback interface device, wherein said user designates which of said buttons is assigned said modified vibration sensation.

35. A method for graphically allowing a user to design the feel of a simulated force sensation to be output by a force feedback interface device coupled to a host computer, said method comprising:

displaying a graphical profile using said host computer, said graphical profile being representative of the force versus time characteristics of said simulated force sensation;

adjusting a shape of said graphical profile in response to said user manipulating said graphical profile using a user-controlled cursor to modify the feel of said simulated force sensation; and commanding said modified simulated force sensation to said force feedback interface device coupled to said host computer such that actuators of said force feedback interface device output a force as a function of time in accordance with requirements of said simulated force sensation.

36. A method as recited in claim 35 further comprising receiving inputs from said user to graphically assign said selected force sensation to a button on said force feedback interface device.

37. A method as recited in claim 35 further comprising saving said modified simulated force sensation as resource file of parameters.

38. A method for providing a force sensation design interface implemented by a computer, said method comprising:

displaying a design interface on a display device of a computer;

receiving input in said design interface from a user, said input selecting a spring of force sensation to be commanded by a host computer and output by a force feedback interface device, said force feedback interface device including a user manipulatable object graspable by a user and moveable in a degree of freedom;

receiving input from a user to specify parameters which define characteristics of said spring force sensation, said parameters including a deadband of said spring force sensation; and displaying a graphical representation of said characterized spring force sensation in said design interface, wherein said graphical representation includes visual representations of said parameters such that said user can view an effect of said parameters on said spring force sensation, wherein said graphical representation includes a representation of a spring including two spring images, wherein said deadband is portrayed in said graphical representation as a space between said two spring images.

39. A method as recited in claim 38 wherein said graphical representation includes an animated graphical representation of a spring that is compressible through user manipulation of said user manipulatable object.

40. A method for providing a force sensation design interface implemented by a computer, said method comprising:

displaying a design interface on a display device of a computer;

receiving input in said design interface from a user, said input selecting a type of force sensation to be commanded by a host computer and output by a force feedback interface device, said force feedback interface device including a user manipulatable object graspable by a user and moveable in a degree of freedom;

receiving input from a user to specify parameters which define characteristics of a particular force sensation of said selected type;

displaying a graphical representation of said characterized force sensation in said design interface, wherein said graphical representation includes visual representations of said parameters such that said user can view an effect of said parameters on said force sensation; and receiving inputs from said user to graphically assign said particular force sensation to a particular one of a plurality of buttons on said force feedback interface device, wherein said user can test the output of said particular force sensation by pressing said particular button.

* * * * *